US012569980B2

(12) United States Patent
Iwatake

(10) Patent No.: US 12,569,980 B2
(45) Date of Patent: Mar. 10, 2026

(54) ROBOT SYSTEM COMPRISING ROBOT EQUIPPED WITH DISPLAY UNIT

(71) Applicant: FANUC CORPORATION, Yamanashi (JP)

(72) Inventor: Takahiro Iwatake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 292 days.

(21) Appl. No.: 18/546,972

(22) PCT Filed: Mar. 25, 2022

(86) PCT No.: PCT/JP2022/014620
§ 371 (c)(1),
(2) Date: Aug. 18, 2023

(87) PCT Pub. No.: WO2022/210412
PCT Pub. Date: Oct. 6, 2022

(65) Prior Publication Data
US 2024/0123607 A1    Apr. 18, 2024

(30) Foreign Application Priority Data

Mar. 31, 2021    (JP) ................................. 2021-060530

(51) Int. Cl.
| *B25J 17/00* | (2006.01) |
| *B25J 9/02* | (2006.01) |
| *B25J 9/16* | (2006.01) |

(52) U.S. Cl.
CPC ............. *B25J 9/023* (2013.01); *B25J 9/1635* (2013.01); *B25J 17/00* (2013.01)

(58) Field of Classification Search
CPC .......... B25J 9/023; B25J 9/1634; B25J 17/00; G05B 2219/40478
See application file for complete search history.

(56) References Cited

U.S. PATENT DOCUMENTS

| 2004/0181149 | A1* | 9/2004 | Langlotz ................ A61B 34/20 600/431 |
| 2005/0046702 | A1* | 3/2005 | Katayama ............. G06T 15/205 348/222.1 |
| 2018/0017461 | A1 | 1/2018 | Arai |
| 2019/0160671 | A1 | 5/2019 | Kurihara et al. |
| 2019/0320995 | A1* | 10/2019 | Amiri .................... A61B 6/505 |

(Continued)

FOREIGN PATENT DOCUMENTS

| CN | 101622647 A | 1/2010 |
| CN | 106808496 A | 6/2017 |
| CN | 106863295 A | 6/2017 |

(Continued)

*Primary Examiner* — Dalena Tran
(74) *Attorney, Agent, or Firm* — HAUPTMAN HAM, LLP

(57) ABSTRACT

This robot system comprises: a display control unit which controls an image to be displayed in a display region of a display unit; and a reference direction setting unit which sets a reference direction for determining the orientation of an image. On the basis of the axial positions of respective joint shafts of the robot and the reference direction, the display control unit controls the orientation of an image shown on the display unit so as to perform display that represents a prescribed postural relation with respect to the reference direction.

14 Claims, 40 Drawing Sheets

(56)　　　　　References Cited

U.S. PATENT DOCUMENTS

2021/0068782　A1*　3/2021　Caluser ............... A61B 8/4245

FOREIGN PATENT DOCUMENTS

| | | | |
|---|---|---|---|
| CN | 109834709 | A | 6/2019 |
| JP | H04-081081 | A | 3/1992 |
| JP | 2015-182142 | A | 10/2015 |
| JP | 2017-030058 | A | 2/2017 |
| JP | 2018-045526 | A | 3/2018 |
| JP | 2018-529488 | A | 10/2018 |
| JP | 2018200527 | A | 12/2018 |
| JP | 6846412 | B2 | 3/2021 |
| WO | 2013/114737 | A1 | 8/2013 |

* cited by examiner

State: Running
Prog.: Sampl1
Speed: 20 deg/s
Count:     10
Time: 16:12:25
Date: 12/01/20

61a

State: Running
Prog.: Sampl1
Speed: 20 mm/s
Count:        10
Time: 16:12:25
Date: 12/01/20

71f

ROBOT SYSTEM COMPRISING ROBOT EQUIPPED WITH DISPLAY UNIT

RELATED APPLICATIONS

The present application is a National Phase of International Application No. PCT/JP2022/014620 filed Mar. 25, 2022, which claims priority to Japanese Application No. 2021-060530, filed Mar. 31, 2021.

TECHNICAL FIELD

The present invention relates to a robot system including a robot including a display part.

BACKGROUND ART

The robot system includes a robot and an operation tool attached to the robot. The robot can perform a predetermined operation while changing its position and orientation. The robot is composed of a plurality of constituent members such as an arm. In the prior art, a robot system with a display device attached to a constituent member of a main body part of a robot is known. For example, in Japanese Unexamined Patent Publication No. 2018-529488T, a holding device for medical applications is proposed in which a display unit composed of a ring or the like of a light emitting diode (LED) member is disposed at a joint axis and the display unit indicates a movement direction or the like.

Also, a camera that can acquire an image with no inclination even when the image is captured in a state where the camera is inclined is known in the prior art (for example, Japanese Unexamined Patent Publication No. 4-81081A).

CITATION LIST

Patent Literature

[PTL 1] Japanese Unexamined Patent Publication No. 2018-529488T
[PTL 2] Japanese Unexamined Patent Publication No. 4-81081A

SUMMARY OF INVENTION

Technical Problem

The robot changes its position and orientation in order to move an operation tool. When the robot is driven in a case where the display part is disposed at a constituent member of the robot, the position and the orientation of the display part change along with the constituent member. As a result, the orientation of an image displayed on the display part for an operator may change, and it may be difficult to view the image displayed on the display part.

Solution to Problem

A robot system according to an aspect of the present disclosure includes a robot including a plurality of joint axes and a display part disposed on a main body part of the robot. The robot system includes a display control unit configured to control an image to be displayed in a display region of the display part and a reference direction setting unit configured to set a reference direction being a direction used as a reference when an orientation of the image to be displayed on the display part is determined. The display control unit controls the orientation of the image in the display region of the display part and displays the image such that display with a predetermined relationship of an orientation relative to the reference direction is provided, on the basis of an axis position of each of the joint axes of the robot and the reference direction.

Advantageous Effect of Invention

According to the aspect of the present disclosure, it is possible to provide a robot system including a display part attached to a main body part of a robot and enabling an image displayed on the display part to be easily viewed when the position and the orientation of the robot change.

BRIEF DESCRIPTION OF DRAWINGS

FIG. 3 is a block diagram of the robot system according to the embodiment.

DESCRIPTION OF EMBODIMENTS

A robot system according to an embodiment will be described with reference to FIGS. 1 to 40. The robot system according to the present embodiment includes a robot including a plurality of joint axes and a display device that displays predetermined information. A display part of the display device is disposed on a main body part of the robot.

Robot System

Figure 1:
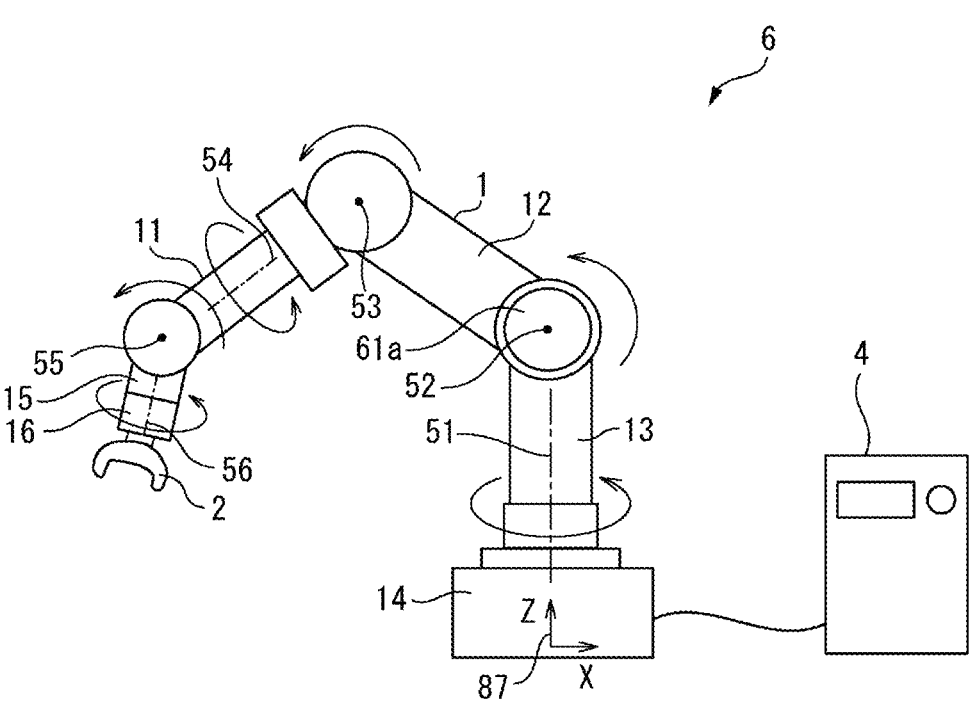
FIG. 1 is a schematic diagram of a robot system according to an embodiment.

FIG. 1 shows a schematic diagram of a first robot system according to the present embodiment. A robot system 6 according to the present embodiment has a function of transporting a workpiece. The robot system 6 includes a robot device including a hand 2 serving as an operation tool (end effector) and a robot 1 that changes the position and the orientation of the hand 2. The robot system 6 includes a controller 4 that controls the robot 1 and the hand 2.

The robot 1 according to the present embodiment includes a base 14 fixed to an installation surface and a turning base 13 supported by the base 14. The turning base 13 is formed so as to rotate with respect to the base 14. The robot 1 includes an upper arm 11 and a lower arm 12. The lower arm 12 is pivotally supported by the turning base 13 via a joint. The upper arm 11 is pivotally supported by the lower arm 12 via a joint. Further, the upper arm 11 rotates about a rotation axis parallel to the extending direction of the upper arm 11. The robot 1 includes a wrist that is coupled to an end of the upper arm 11. The wrist 15 is pivotally supported by the upper arm 11 via a joint. The wrist 15 includes a flange 16 that rotates about a rotation axis along the extending direction of the wrist 15. The hand 2 is fixed to the flange 16.

Figure 2:
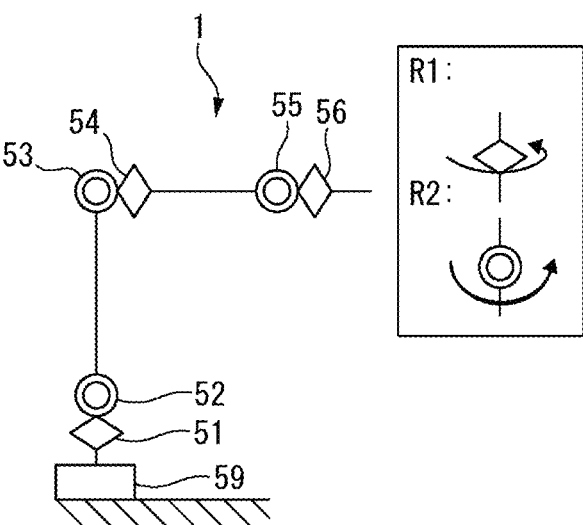
FIG. 2 is a schematic diagram for explaining a joint axis of a robot according to the embodiment.

FIG. 2 shows a schematic diagram of the robot for explaining joint axes of the robot according to the present embodiment. In the present invention, the joint axis is an axis at a joint connecting links included in the robot and is a part that changes a positional relationship or an angular relationship between the links. It is possible to change the positional relationship between the links by changing the axis position of each axis (an angle in a case of a rotation axis, and the length of displacement in a case of a linear motion axis). As a result, it is possible to change at least one of the position of a tip part of the robot and the orientation. It should be noted that an actuator for moving the axis position of the joint axis may be installed at a location that is different from the part serving as the joint axis.

Referring to FIGS. 1 and 2, the robot 1 according to the present embodiment is composed of six joint axes. These six joint axes are a J1 axis 51 as a first joint axis, a J2 axis 52 as a second joint axis, a J3 axis 53 as a third joint axis, a J4 axis 54 as a fourth joint axis, a J5 axis 55 as a fifth joint axis, and a J6 axis 56 as a sixth joint axis in the order from the side of a pedestal 59, which is the base 14 of the robot 1.

As illustrated on the right side in FIG. 2, the J1 axis 51, the J4 axis 54, and the J6 axis 56 serve as rotation axes R1 each rotating about a corresponding link connecting joint axes. Also, the J2 axis 52, the J3 axis 53, and the J5 axis 55 serve as rotation axes R2 rotating about a direction that perpendicularly intersects the corresponding link connecting the axes.

The hand 2 according to the present embodiment grips and releases a workpiece. The hand 2 grips a workpiece by closing claw parts facing each other. The operation tool is not limited to the hand that grips a workpiece. Any operation tool can be attached to the robot in accordance with an operation that is performed by the robot system. For example, it is possible to attach a welding torch to the robot in a case where the robot system performs arc welding.

FIG. 2 is a simple explanatory diagram for representing a configuration of the axes of the robot 1. Also, the position of the origin of each axis is represented as the position in a coordinate system set in a space when the origin of each joint axis is defined as an origin of a coordinate system (joint coordinate system) set for each axis and as a point where links are connected. It should be noted that a coordinate system set in a space and used as a reference when the position and the orientation of the robot, such as a joint axis, a link, a tip part, an operation tool attached to the tip part, or the like of the robot are represented will be referred to as a reference coordinate system 87 of the robot below. The reference coordinate system 87 is a coordinate system in which the position of the origin and the directions of the coordinate axes are fixed in the space where the robot is disposed.

In the present embodiment, the position of a joint axis is an angle of a rotation axis in a case where the joint axis is the rotation axis. Moving the position of the joint axis represents changing the position by rotating around the rotation axis. Also, in a case where a joint axis is a linear motion axis, the position of the joint axis is the position of the linear motion axis in the movement direction. Moving the position of the joint axis represents changing the position by moving along the linear motion axis. Also, in a case where the position of the origin of the joint axis is referred to, it represents the position of the origin of the coordinate system set for each axis in the coordinate system set in a space. Also, the coordinate system set in the space is a coordinate system for representing at least one of the position and the orientation of the tip part (operation tool) of the robot 1, the flange 16 for attaching the tip part to the robot 1, or the coordinate system set for each axis in the orthogonal coordinate system fixed to the space.

Additionally, a coordinate system set in the robot device in order to represent at least one of the position and the orientation of the robot 1 in the reference coordinate system 87 of the robot set in the space is defined as a tool coordinate system. An origin of the tool coordinate system, which is also a point to be translated and is also a center point at the time of rotational movement, is defined as a control point. Although all the six axes of the robot 1 are defined as rotation axes in the present embodiment, the robot 1 may include a linear motion axis. Also, the robot 1 according to the present embodiment is a vertical articulated robot composed of the six axes. However, the robot 1 may be any robot having another aspect as long as the position of each axis can be controlled or the orthogonal position can be controlled in the robot.

It should be noted that in a case where the robot is mounted on a traveling axis, another drive device, or the like which is a device that changes the position and the orientation of the robot, the reference coordinate system of the robot may be set in the space such that the position and the orientation of the robot or a part of the robot are determined in consideration of driving of the drive device.

Figure 3:
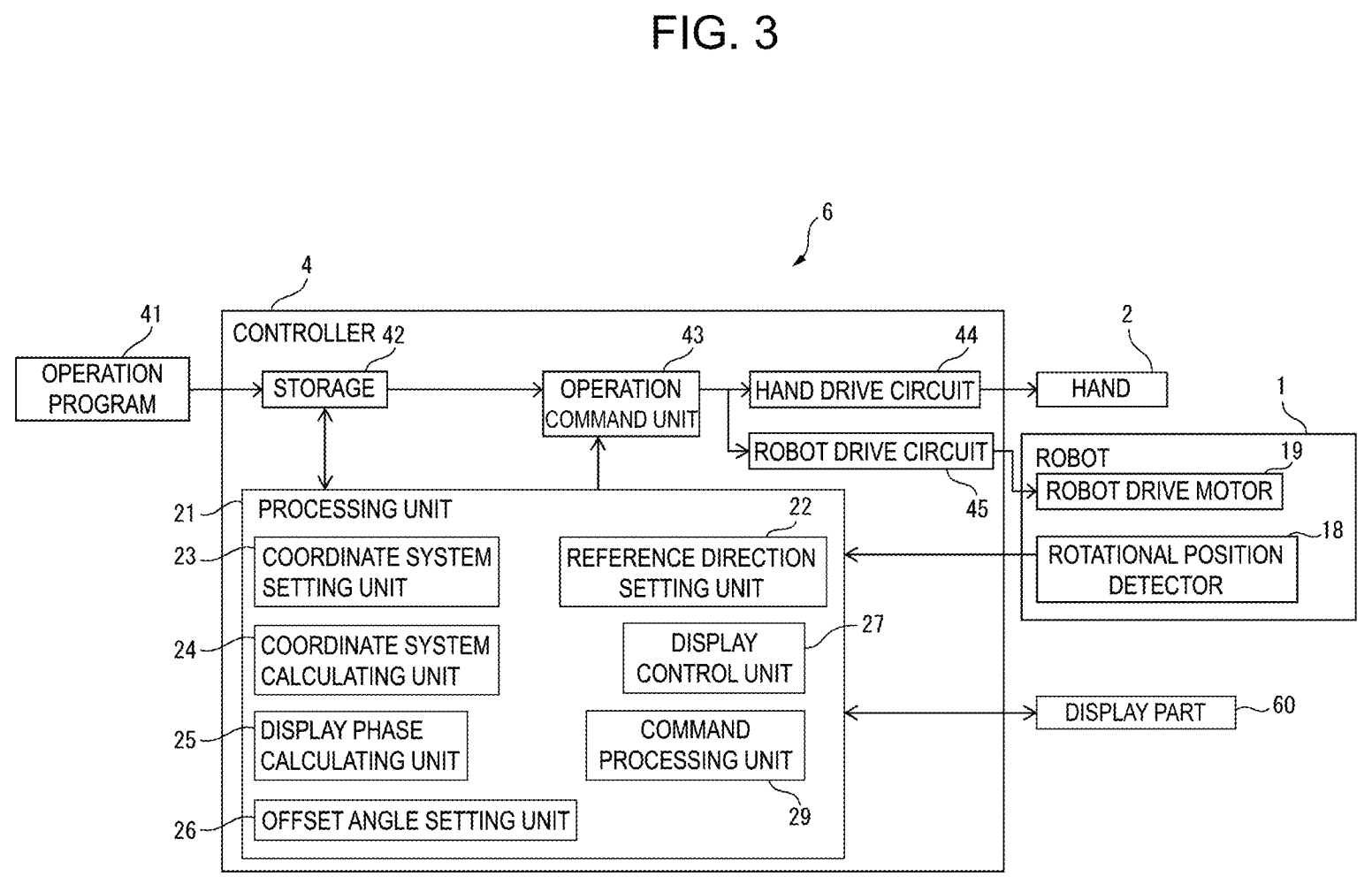

FIG. 3 is a block diagram of the robot system according to the present embodiment. Referring to FIGS. 1 to 3, the robot 1 includes a robot drive part for changing the position and the orientation of the robot 1. The robot drive part includes a robot drive motor 19 that serves as an actuator for driving a constituent member such as an arm. The robot drive part drives the actuator disposed at each joint axis so as to move the rotational position of the joint axis of the robot 1.

It should be noted that the robot drive part may be configured on the basis of any principle or power as long as it is possible to drive and displace the joint axes of the robot. Also, in a case where the joint axes are linear motion axes, the robot drive part drives the actuator disposed at each joint axis so as to move the position on the linear motion axis. The hand 2 includes a hand drive part that drives the hand 2. The hand drive part includes a pressurizing pump, a valve, and the like for driving the claw parts of the hand 2.

The controller 4 includes an arithmetic processing device (computer) including a central processing unit (CPU) serving as a processor. The arithmetic processing device includes a random access memory (RAM) and a read only memory (ROM), and the like connected to the CPU via a bus. An operation program 41 includes a command sentence for driving the robot 1 and the hand 2. The robot system 6 transports a workpiece by being driven in accordance with the operation program 41.

The controller 4 includes a storage 42 that stores information. The storage 42 stores information related to control of the robot 1 and the hand 2. The operation program 41 is stored in the storage 42. The storage 42 can be formed of a non-transitory storage medium. For example, the storage 42 can be formed of a storage medium which can store information, such as a volatile memory, a nonvolatile memory, a magnetic storage medium, or an optical storage medium.

The controller 4 includes an operation command unit 43 that transmits an operation command. The operation command unit 43 corresponds to a processor that is driven in accordance with the operation program 41. The processor functions as the operation command unit 43 by reading the operation program 41 and performing control defined by the operation program 41. The robot drive part is driven in accordance with the operation command of the robot 1 output from the operation command unit 43, and the rotational position of the robot drive motor 19 at the joint axis of the robot 1 is changed.

The operation command unit 43 transmits an operation command for driving the robot 1 to a robot drive circuit 45. The robot drive circuit 45 includes an electric circuit that drives the robot drive motor 19. The robot drive circuit 45 supplies electricity to the robot drive motor 19 in accordance with the operation command. The operation command unit 43 transmits an operation command for driving the hand 2 to a hand drive circuit 44. The hand drive circuit 44 includes an electric circuit that drives the hand drive part. The hand drive circuit 44 supplies electricity to the hand drive part in accordance with the operation command. Although the controller 4 according to the present embodiment is installed separately from the robot 1, the embodiment is not limited to this. The controller may be disposed inside the robot.

The robot 1 includes a rotational position detector 18 that outputs axis position data, which is a rotational position of the joint axes of the robot 1. The rotational position detector 18 is formed of an encoder, for example. It is possible to detect the position and the orientation of the robot 1 by an output of the rotational position detector 18. The rotational position detector 18 according to the present embodiment is attached to the robot drive motor 19 disposed corresponding to each joint axis.

The robot system 6 according to the present embodiment includes a display device that displays arbitrary information. The display device includes at least one display part 60 disposed on a main body part of the robot 1. In FIG. 1, a display part 61a is attached to a joint between the turning base 13 and the lower arm 12, as an example of the display part 60. The display device includes a processing unit 21 that generates an image to be displayed on the display part 60 and processes a command from the display part 60. In the present embodiment, the processing unit 21 is included in the controller 4.

The processing unit 21 includes a reference direction setting unit 22 that sets a reference direction, which is a direction used as a reference when the orientation of an image to be displayed on the display part 60 is determined. The processing unit 21 includes a coordinate system setting unit 23 that sets a display coordinate system, which is a coordinate system set in the display region of the display part 60.

The processing unit 21 includes a coordinate system calculating unit 24 that calculates the position and the orientation of the display coordinate system on the basis of the axis position of each of the joint axes of the robot 1. The processing unit 21 includes a display phase calculating unit 25 that calculates a display phase direction, which is a direction used as a reference of the orientation of display in the display region of the display part 60. The processing unit 21 includes an offset angle setting unit 26 that sets an offset angle of an image to be displayed on the display part. The processing unit 21 includes a command processing unit 29 that processes a command input through an operation of the display part 60. The processing unit 21 includes a display control unit 27 that controls an image to be displayed in the display region of the display part 60.

The processing unit 21 corresponds to a processor that is driven in accordance with the operation program 41. The processor functions as the processing unit 21 by reading the operation program 41 and performing control determined by the operation program 41. Also, each unit of the reference direction setting unit 22, the coordinate system setting unit 23, the coordinate system calculating unit 24, the display phase calculating unit 25, the offset angle setting unit 26, the display control unit 27, and the command processing unit 29 included in the processing unit 21 corresponds to a processor that is driven in accordance with the operation program 41. The processor functions as each of the units by performing control determined by the operation program 41.

Display Part

The robot system 6 according to the present embodiment includes one or more display parts 60 on the main body part of the robot such as a link, a joint axis, or an arm tip of the arm or the like of the robot. The display part 60 is attached to a constituent member of the robot that changes the position and the orientation by being driven by the robot drive part. The display part 60 changes its position and orientation when the robot is driven at the joint axes. Additionally, the robot may be mounted on the drive device that changes its position and orientation. The present invention can be applied even to a case where the position and the orientation of the display part 60 are changed by the drive device. As the display part 60 of the display device, any display panel that can display letters, drawings, or the like in a recognizable manner can be employed. For example, it is possible to employ a liquid crystal display panel, an organic electro luminescence (EL) display panel, or the like as the display part 60.

The display part 60 is configured so as to be appropriately attached to an installation part and is preferably thin. The display part 60 preferably has a shape that does not significantly stick out of the main body part of the robot. Also, the display part 60 preferably has a shape that is integrated with the main body part of the robot and has a smooth outer surface in a case where the display part 60 is disposed at an end of the robot.

Figure 4:
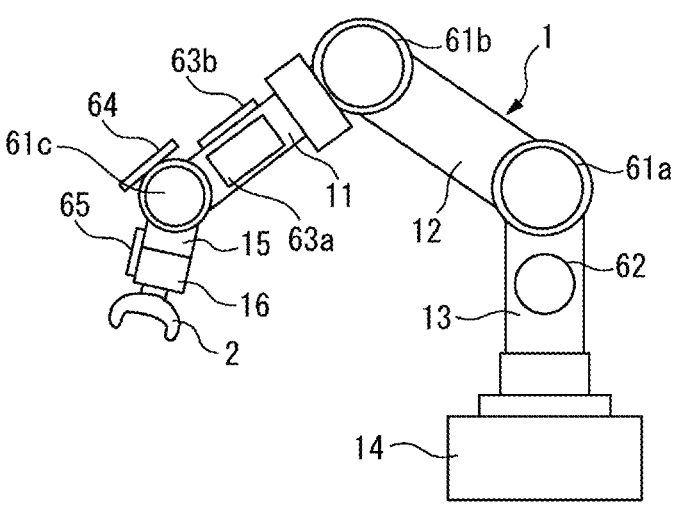
FIG. 4 is a schematic diagram of the robot for explaining a planar-shaped display part attached to the robot.

FIG. 4 is a schematic diagram of the robot for explaining examples of various display parts according to the present embodiment. Display parts 61*a*, 61*b*, 61*c*, 62, 63*a*, 63*b*, 64, and 65 are formed in plate shapes to include planar-shaped display regions. The display parts 61*a* and 61*b* are fixed to joints such that their display regions are perpendicular to the J2 axis 52 and the J3 axis 53, respectively. The display part 61*c* is fixed to a joint such that its display region is perpendicular to the J5 axis 55. The display parts 61*a*, 61*b*, and 61*c* move along with the joints.

The display part 62 is fixed to the turning base 13 such that its display region is parallel to the J1 axis. The display part 62 rotates along with the turning base 13. The display parts 63*a* and 63*b* are fixed to the upper arm 11 such that their display regions are parallel to the J4 axis 54. The display parts 63*a* and 63*b* move along with the upper arm 11. The display part 64 is disposed such that its display region is parallel to the J5 axis 55. The display part 65 is fixed to the wrist such that its display region is parallel to the J6 axis 56. The display parts 64 and 65 move along with the wrist 15. In this manner, the display parts 61*a*, 61*b*, 61*c*, 62, 63*a*, 63*b*, 64, and 65 are fixed to constituent members of the robot 1 and move along with the constituent members of the robot 1. Also, each display part rotates about the joint axis of the robot 1 as a rotation axis.

Figure 5:
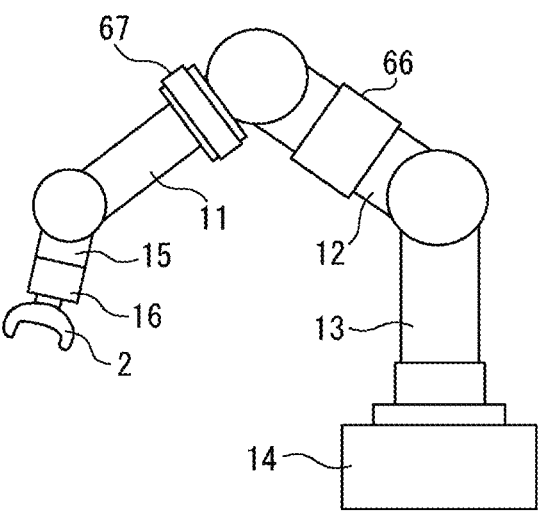
FIG. 5 is a schematic diagram of the robot for explaining a curved-shaped display part attached to the robot.

FIG. 5 is a schematic diagram of another robot for explaining examples of various display parts according to the present embodiment. The display parts 66 and 67 are formed of display panels with flexibility. The display parts 66 and 67 are formed such that their display regions extend in the circumferential direction along surfaces of the constituent members of the robot 1. The display parts 66 and 67 can be formed of display panels that are thin and flexible, such as organic EL display panels, for example. The display part 66 is fixed such that it is wound around the lower arm 12. The display part 66 is formed such that its display region is parallel to the direction in which the lower arm 12 extends. The display part 67 is fixed such that it is wound around the upper arm 11. The display part 67 is formed such that its display region is parallel to the direction in which the upper arm 11 extends. The display parts 66 and 67 are fixed to constituent members of the robot 1 and move along with the constituent members of the robot 1.

Each of the display parts 66 and 67 according to the present embodiment is formed of one display panel, but is not limited to the mode. A plurality of display panels may be disposed around constituent members of the robot 1 so that the display parts are formed surrounding the constituent members. One image may be displayed on the plurality of display panels.

Figure 6:
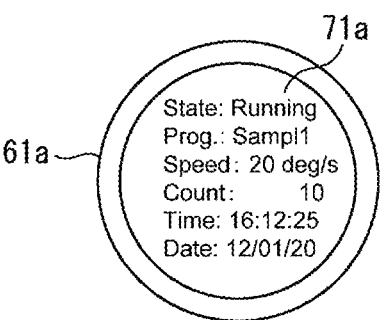
FIG. 6 is a first image displayed on the display part.
Figure 7:
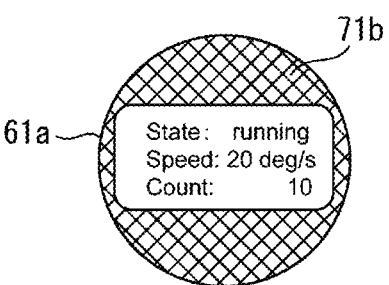
FIG. 7 is a second image displayed on the display part.

FIG. 6 illustrates a first image displayed on the display part. FIG. 7 illustrates a second image displayed on the display part. In the following embodiment, the display part 61*a* disposed between the turning base 13 and the lower arm 12 will be described as an example from among the various display parts. The display control unit 27 of the display device can display an image in the display region of the display part 61*a* on the basis of data transmitted from another device. Information displayed on the display part includes, for example, an operation state of the robot, a name of an operation program that is executed, an execution status of the operation program, a status of an alarm, a drive speed of the robot, the number of times that an operation has been executed, the number of times extraction has been failed, and the like. In this regard, the drive speed or the operation speed of the robot may be a translational speed or a rotation speed of the tip part of the robot, the tool coordinate system, or the like. Moreover, the drive speed or the operation speed of the robot may be a rotation speed or the like of each joint axis. The same applies to the following description unless a change is particularly made.

Also, the information to be displayed on the display part includes factors and countermeasures at the time of occurrence of problems, content of operation to be executed next, a connection status of a network to which the robot is connected, a load status of an actuator included in the robot drive part that drives the robot, current time, date and time, elapse time of an operation, and the like. The information displayed on the display part is preferably information that is useful for the operator by being displayed on the main body part of the robot, such as information regarding an operation or setting of the robot or arbitrary information to be transmitted from an external device or the like to the robot.

In a first image 71*a*, information regarding whether the robot drive motor is driven (State), the name of the operation program that is executed (Prog.), a drive speed of rotation of the joint axis (Speed), the number of times that the program has been executed (Count), time, and date are displayed. Information indicating that the robot is driven is also displayed in a second image 71*b*.

Figure 8:
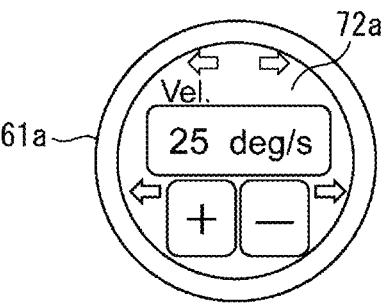
FIG. 8 is a third image displayed on the display part.

FIG. 8 illustrates a third image displayed on the display part. The display part may have not only a display function of displaying information but also an input function of inputting predetermined information through an operation of the operator. The display device can display an input image for inputting predetermined information on the display part. A third image 72*a* is an input image for setting a drive speed of rotation of an joint axis where the display part is disposed or a desired joint axis. It should be noted that a joint axis other than one joint axis may also be driven along with the one joint axis. In this case, when the drive speed of rotation of the one joint axis is changed, the drive speeds of all the joint axes may be adjusted such that the position and the orientation of the tip part of the robot do not change. Additionally, the movement speed of the tip part of the robot in the operation program that is executed may be changed in the input image displayed on the display part.

The display device may function as an input device where information is input through an operation of the operator according to an input image. Moreover, the display device can function as a teaching device that manually drives the robot or creates the operation program. For example, the display device can include, as a display part, a touch screen display panel that allows an input operation. Alternatively, the display device may include a button for carrying out an emergency stop or a desired function.

In this manner, the display device according to the present embodiment includes both the device having only a display function and the device having a display function and an input function. Referring to FIG. 3, a command input to the display part 60 of the display device is sent to the command processing unit 29. The command processing unit 29 processes the input command. For example, the command processing unit 29 sends an operation command of the robot to the operation command unit 43 and changes a setting value that is stored in the storage 42 and is for driving the robot.

The display control unit 27 can display an arbitrary input image in the display region. For example, it is possible to display an image of a software keyboard, an image of only numbers, an image of changing an input numerical value by moving a bar-shaped image such as a slide bar, or the like. Also, the display control unit 27 can display an image for continuously performing an input operation by rotating a predetermined image, an image to be turned like a dial of an analog telephone, a button related to a change in screen, or the like.

As an information input method, it is possible to employ an arbitrary input method such as an input through a contact with the display region like a touch screen or a non-contact input using a capacitive sensor. In a case where an input is performed in a non-contact manner, it is possible to input information through an operation in a space above the display region. As a device that detects the input operation, it is possible to use a device based on an arbitrary sensing method, such as a capacitive sensor, an optical sensor, an optical camera, an infrared camera, or an ultrasonic sensor.

Moreover, a contact or non-contact sensor may be caused to operate as a contact sensor that detects a contact with a person or an object in the surroundings in addition to the input device for inputting information. In other words, a sensor that detects an input operation may be used as a sensor for securing safety, by switching an operation mode.

The information input to the display device is transmitted through wired or wireless communication to the controller of the robot or another device such as a device connected via a network. Alternatively, the input information may be saved or stored in a teaching device having a display function. Information calculated or processed on the basis of the input information may be displayed on the display part of the display device.

The input image that is an image allowing the operator to input information is preferably configured such that arbitrary information can be input to perform setting, checking, or the like. For example, the input image is preferably configured such that a change in setting value, a change in drive speed of the robot, a command for causing the robot to wait, a change in operation of the robot, driving of the robot, or interruption of the operation can be input. Moreover, the input image may be an image allowing an arbitrary input, such as an input of information regarding a tool, a workpiece, or the like for performing an exchange work of the tool attached to the tip part of the robot, setting of a coordinate system, teaching of the position, a change to a direct teach mode, a change to an automatic driving mode, or the like. Functions allowing control of setting values are preferably limited to functions that are frequently used or to simple functions. Alternatively, the input image may be formed such that the types of input functions can be changed.

Also, the display part may display an image where an input of specific information allowing an input operation of the operator is received, when information is input to the display device. The display part may perform switching into an image allowing an input operation of the operator in response to an input of specific information by the operator. For example, the operator may press a button that enables an input for a predetermined period of time or longer, may input a password, or may move their finger in contact with the display region such that the finger passes through a predetermined point in the display region. In this manner, the display control unit may display an image inhibiting the input operation in order to prevent an erroneous input operation and the like. Additionally, an image allowing an input operation may be displayed in response to an operator's operation such as an input of a password.

In a case where information is input to the display device, at least one of a privilege with which an input operation can be performed and a privilege regarding information to be displayed may be changed through a predetermined input operation. It is possible to change items that can be set, to change an operation of the robot, to change a range of numerical values that can be set, or to change information to be displayed, by performing a predetermined input operation. In this manner, the display device may change a command, information, or the like that can be input or change data or information that can be displayed.

The display part may be formed attachable to and detachable from the main body part of the robot. In particular, the display device including the display part and the display device forming a teaching device may be formed attachable to and detachable from the main body part of the robot. In this case, the display device can include a battery. Alternatively, the display device is preferably fed with power when the display device is attached to the main body part of the robot. Also, a device that transmits information to be displayed on the display device or the device that transmits information input to the display device may be formed connected in a wired or wireless manner.

Also, the display coordinate system set in the display part can be configured such that a coordinate system generated in advance is applied in accordance with the attachment position of the display part that is attached to a predetermined position in the main body part of the robot. Alternatively, the display coordinate system may be directly input or may be set by a method in the prior art, after the display part is attached.

In a case where the display part that is attachable to and detachable from the robot functions as a teaching device, it is possible to use the display device only in a case where the teaching device is needed. In a case where a plurality of display parts are included, it is possible to install a teaching device only at a necessary part of the robot and use the teaching device. It is thus possible to reduce the cost of the robot system and to reduce risk of breakage of the teaching device due to collision against a peripheral device during an operation of the robot while improving operability of the robot.

Basic Control for Displaying Image

Figure 9:
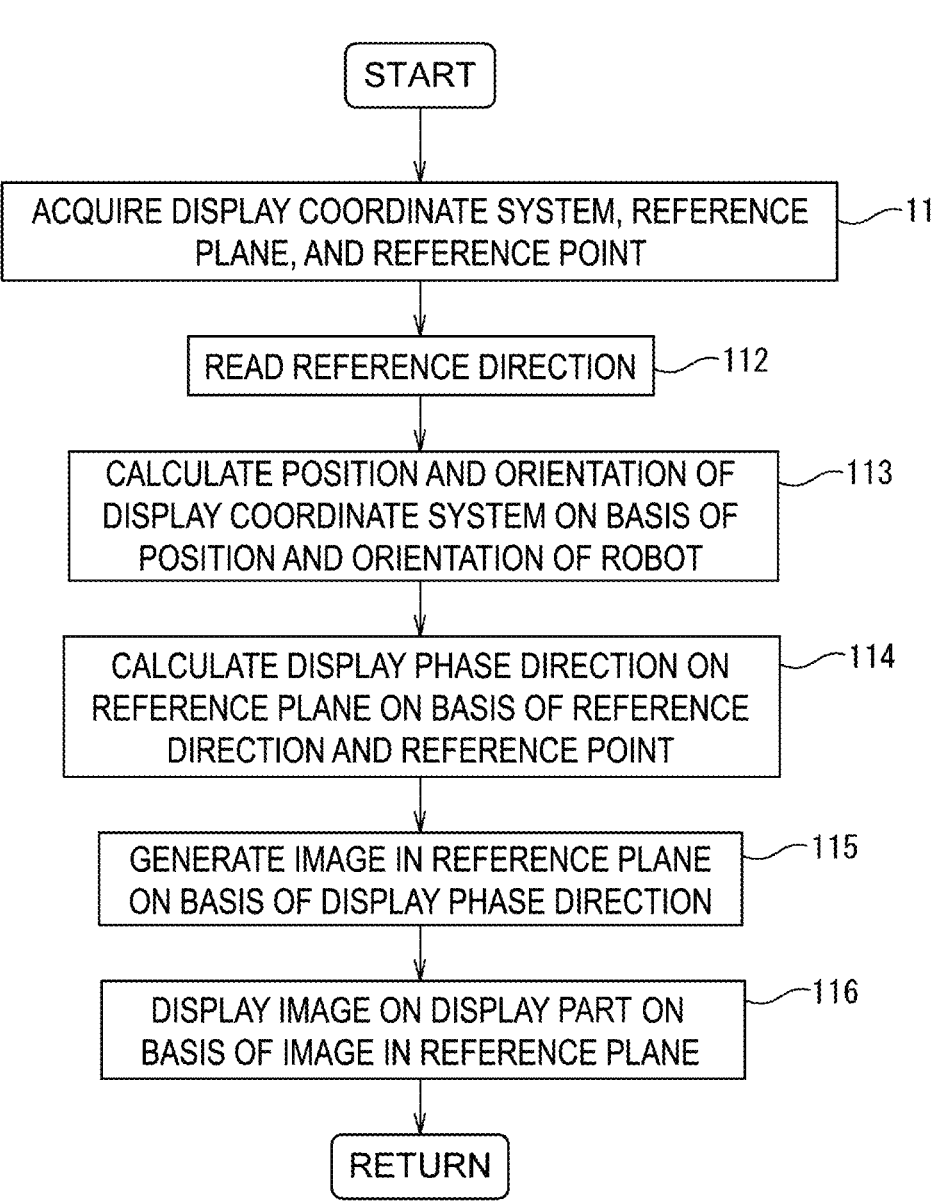
FIG. 9 is a flowchart of control for displaying an image on the display part according to the embodiment.

FIG. 9 illustrates a flowchart of control for displaying an image on the display part according to the present embodiment. Referring to FIG. 3, the coordinate system setting unit 23 sets a display coordinate system corresponding to the display part and a reference plane and a reference point set in the display coordinate system before the display control unit 27 displays an image. The coordinate system setting unit 23 sets the display coordinate system, the reference plane, and the reference point in response to an operation of the operator, for example. Also, the reference direction setting unit 22 sets a reference direction, which is a direction used as a reference of display, under predetermined control. The storage 42 stores the display coordinate system, the reference plane, the reference point, and the reference direction.

Referring to FIGS. 3 and 9, the processing unit 21 acquires the display coordinate system, the reference plane, and the reference point from the storage 42 in Step 111. In Step 112, the processing unit 21 acquires the reference direction from the storage 42.

In Step 113, the coordinate system calculating unit 24 calculates the position and the orientation of the display coordinate system on the basis of the position and the orientation of the robot 1. Specifically, the coordinate system calculating unit 24 calculates the position and the orientation of the display coordinate system on the basis of an output of the rotational position detector 18. The position and the orientation of the reference plane and the position of the reference point expressed in the display coordinate system are calculated.

In Step 114, the display phase calculating unit 25 calculates the display phase direction in the reference plane on the basis of the reference direction and the reference point. In other words, the display phase calculating unit 25 sets the orientation of an image on the display part. In Step 115, the display control unit 27 generates an image in the reference plane on the basis of the display phase direction. Then, in Step 116, the display control unit 27 displays an image on the display part 60 on the basis of the image in the reference plane. Next, the control will be described in detail.

Coordinate System Setting Unit

Figure 10:
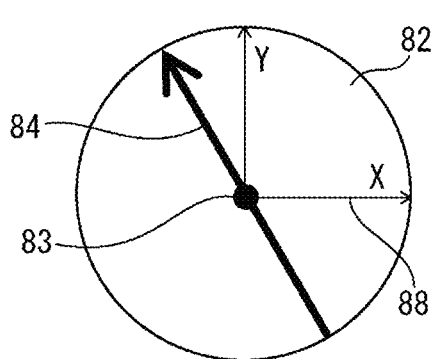
FIG. 10 is a plan view for explaining a display coordinate system, a reference point, a reference plane, and a display phase direction.

FIG. 10 is a schematic plan view for explaining a display coordinate system, a reference plane, a reference point, and a display phase direction. FIG. 10 corresponds to a plan view of the display region of the display part 61a. The coordinate system setting unit 23 of the processing unit 21 sets a display coordinate system 88, which is a coordinate system set in the display region of the display part. The coordinate system setting unit 23 sets, in the display region of the display part, a reference plane 82, which is a plane serving as a reference of the display region of the display part and is set in the display coordinate system, and a reference point 83, which is a point as a reference of display in the display region of the display part and is set in the display coordinate system.

The display coordinate system can be set while having an arbitrary position and orientation relative to the display region of the display part. By using the display coordinate system, the position and the orientation of the display part or the display region installed on the main body part of the robot is represented in the coordinate system used as a reference, such as a reference coordinate system of the robot. In the display part 61a, the display coordinate system is set such that the plane formed by two coordinate axes and the display region are in the same plane.

The reference plane is a plane used as a reference when an image to be output to the display region of the display part is represented on the plane. Also, the reference plane is a plane set in the display coordinate system. The position and the orientation of the reference plane in the display coordinate system can be determined in advance. In the display part 61a, the reference plane is set to a plane including two coordinate axes of the display coordinate system. The reference point is a point defined at the center position of the image to be output to the display region of the display part. The orientation of the image is determined by rotating the image about the reference point as a rotation center in the reference plane.

The reference direction can be set to an arbitrary direction independently of the display coordinate system. The reference point is set on the reference plane. The reference plane can be set independently of the direction of the coordinate axes of the display coordinate system. For example, the reference plane may be inclined with respect to an XY plane of the display coordinate system. However, in a case where the display region of the display part has a planar shape, the display region, the reference plane, and the plane formed by the two coordinate axes of the display coordinate system are preferably in the same plane. It is possible to reduce the amount of calculation through such setting.

In a case where the display region of the display part has a curved shape instead of the planar shape, it is possible to set a reference point in the display region and to define a tangent plane at the reference point as the reference plane. In this case, the reference plane does not include the display region even when the XY plane in the display coordinate system and the reference plane are in the same plane.

The display control unit 27 can generate an image to be displayed on the reference plane when the display phase calculating unit 25 defines the display phase direction on the reference plane. Next, the display control unit 27 can generate an image to be displayed on the display part by projecting the image on the reference plane onto the display region of the display part.

The coordinate system setting unit 23 can set the display coordinate system 88, the reference plane 82, and the reference point 83 under arbitrary control. For example, the operator can define the display coordinate system 88, the reference plane 82, and the reference point 83 in advance on the basis of the shape of the display region of the display part and input them to the processing unit 21. Basically, these setting values are defined for the display part and can be defined as standard setting values in advance before the display part is attached to the robot. The operator can change the setting values as needed. For example, the operator may change the standard values of the display for convenience of an operation in accordance with a state of the robot to be displayed on the display part after the standard values are set for the display part.

Also, the coordinate system setting unit 23 may automatically set the display coordinate system 88, the reference plane 82, and the reference point 83 in the display part. For example, there may be a case where the display part has a wide range of display region. As illustrated in the display parts 66 and 67 in FIG. 5, there may be a case where display parts with flexibility are wound around constituent members of the robot. In such a case, the coordinate system setting unit 23 may automatically set the display coordinate system, the reference plane, and the reference point in order that an image be displayed in the same direction regardless of the rotational positions of the constituent members. For example, the coordinate system setting unit 23 may move display setting values about the joint axes and automatically set them.

In addition, in a case where the display parts 66 and 67 are formed, a plurality of display parts may be combined and disposed surrounding the constituent members of the robot. In this case, the display coordinate system, the reference plane, and the reference point may be set in each display region of one display part. Alternatively, a plurality of display parts may be combined to configure one display part at a predetermined part of the robot, and the display coordinate system, the reference plane, and the reference point may then be set. In this case, control may be performed in order to divide the image into pieces for respective display parts and cause the display parts to display them.

The display control unit 27 controls the position and the orientation (phase) of display in the display region of the display part and performs display on the basis of the reference point 83, which is a reference point for display in the display region of the display part, and the display phase direction (the direction indicated by the arrow 84), which is a direction calculated by the display phase calculating unit 25 and serves as a reference for the orientation of the display in the display region of the display part. For example, the display control unit 27 can display an image such that the upper side of the image is located in the direction indicated by the arrow 84.

In the present embodiment, the display control unit 27 defines the center position of display in the display region of the display part by using the reference point 83. The display control unit 27 determines the orientation of the display by rotating the image about the reference point 83 as a rotation center in the reference plane 82. Although the origin of the display coordinate system 88 and the reference point are disposed at the same position in the present embodiment, the origin and the reference point may be disposed at different positions.

The display phase direction indicated by the arrow 84 is set such that it is present on the reference plane 82 and passes through the reference point 83. In a case where the display region of the display part has a planar shape, the reference plane 82 is preferably parallel to the display region or in the same plane as the display region. Although the display region of the display part has a planar shape in the present embodiment, the display region may have another shape such as a curved shape instead of the planar shape.

In a case where the display region of the display part has a curved shape, the tangent plane at a predetermined point in the display region can be used as a reference plane. The reference plane can be a plane formed by two coordinate axes of the display coordinate system by using a predetermined point in the display region as an origin of the display coordinate system. An image displayed in the display region of the display part can be displayed on the basis of the reference point and the display phase direction or can be displayed by projecting an image in the reference plane onto the display region. An image to be displayed in the display region may be displayed by any method, such as display based on calculated information.

It should be noted that although the display region (the part where an image is displayed on the display panel) of the display part 61*a* has a circular shape, the display region may have an arbitrary shape such as a regular polygonal shape. In this case, the reference point can be disposed at the center part of the display region. For example, the reference point can be set at the position of the center of gravity of the shape of the display region.

Coordinate System Calculating Unit

The coordinate system calculating unit 24 calculates the position and the orientation of the display coordinate system 88 on the basis of the axis position of each joint axis of the robot 1. The coordinate system calculating unit 24 calculates the position and the orientation of the display coordinate system 88 in the coordinate system used as a reference, such as the reference coordinate system 87, on the basis of the axis position (an angle in a case of a rotation axis) of each joint axis of the robot 1, a relationship between the positions and the orientations of the joint axes represented by Denavit Hartenberg (DH) parameters or the like, and the positions and the orientations of the coordinate systems of the joint axes (joint coordinate systems).

In this regard, the relationship between the joint coordinate systems and the position and the orientation of the display part (the position and the orientation of the display coordinate system 88) is set. In particular, it is preferable to select the joint coordinate system in which the relationship of the position and the orientation with the display part is fixed and to calculate the relationship between the positions and the orientations of the display coordinate system and the joint coordinate system in advance. In the case of the present embodiment, it is preferable to set the relationship of the positions and the orientations of the joint axes connected in order via the links and the joint coordinate system set for the closest joint axis from the display part toward the side of the pedestal 59 of the robot in advance.

It should be noted that it is possible to calculate the position and the orientation of the display coordinate system in the coordinate system used as a reference, by a method widely recognized by those skilled in the art regardless of the mode of the robot. For example, a simultaneous transformation matrix (a relationship of positions and orientations) to the joint axis for which the relationship of the position and the orientation relative to the display part is fixed, in the coordinate system used as a reference, is defined. It is possible to obtain the position and the orientation of the display coordinate system in the coordinate system used as a reference from the homogeneous transformation matrix of the joint axis and the display part.

In a case where the robot is mounted on a device that changes the position and the orientation of the robot such as a traveling axis, another drive device, or the like, the position and the orientation of the display coordinate system may be calculated in consideration of the movement amount of such a drive part. Also, a relative relationship of the position and the orientation relative to the peripheral device that is installed separately from the robot and is driven may be defined as the position and the orientation of the display coordinate system. In this case, the relative position and orientation of the display coordinate system may be calculated in consideration of a change in position and orientation of all the drive parts up to the display coordinate system, including the device that is installed separately from the robot and is driven.

Reference Direction Setting Unit

The reference direction setting unit 22 sets a reference direction, which is a direction used as a reference when the orientation of an image to be displayed on the display part is determined. The reference direction setting unit 22 sets the direction of the robot 1 in the reference coordinate system 87 as a reference direction. Also, the reference direction may be a direction in the coordinate system that is convenient for setting the reference direction. Additionally, the reference direction setting unit 22 may set the reference direction by using the coordinate system set so as to be fixed to the space where the robot system is present.

The reference direction setting unit 22 may set the reference direction by the direction of the robot in the reference coordinate system 87 by using the reference coordinate system 87 that is set in the robot 1 and is for representing the position and the orientation of the robot, such as each joint or an arm tip of the robot 1. Also, the reference direction setting unit 22 may set the reference direction by using the coordinate system set in a predetermined part of the robot 1. It should be noted that the reference direction moves along with driving or moving of the predetermined part of the robot in this case.

Also, the reference direction setting unit 22 may set the reference direction by using a reference coordinate system of a device in the surroundings of the robot, such as a device disposed near the robot 1, a jig, another robot, or another drive device. At this time, the reference direction setting unit 22 may set, in the device in the surroundings, the reference direction at a part where the position and the orientation change due to driving or moving of the device in the surroundings. It should be noted that in this case, the reference direction changes along with driving or moving of the device in the surroundings.

It is possible to set a direction in which the operator can easily view an image displayed on the display part, when the reference direction setting unit sets the reference direction in a desired coordinate system. Also, it is possible to set a direction in which an input is easily performed in an input image on which an input operation is performed. In addition, various implementing methods are conceivable as methods for setting the reference direction, and examples thereof will be described below.

Figure 11:
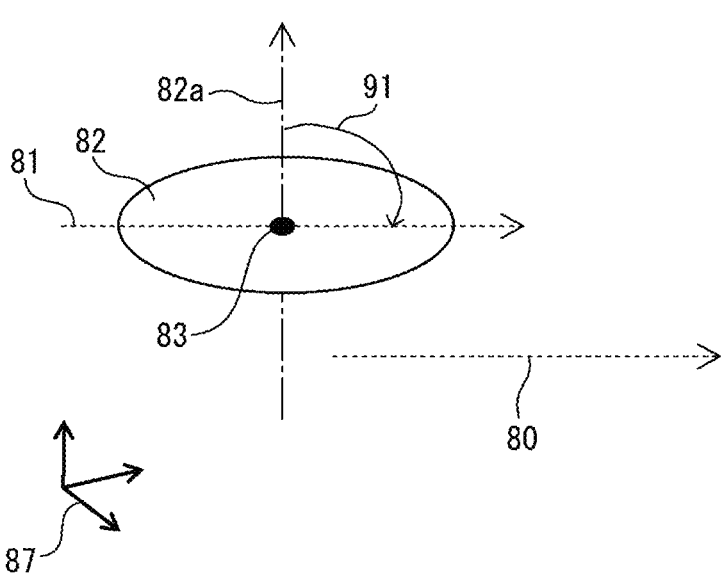
FIG. 11 is a schematic diagram for explaining first control for setting a reference direction.

FIG. 11 is a perspective view of a reference plane for explaining first control in which the reference direction setting unit sets the reference direction. The reference direction setting unit 22 may set the reference direction such that a predetermined relationship of orientation relative to a normal direction at the reference point 83 in the reference plane 82 set in the display region is satisfied in the reference coordinate system 87 of the robot. For example, the reference direction setting unit 22 may set, as the reference direction, the direction obtained by a predetermined homogeneous transformation matrix relative to the normal direction. In the example described here, the reference plane 82 and the display region of the display part are in the same plane. Therefore, the reference direction setting unit 22 may set the reference direction such that a predetermined relationship of orientation relative to the normal direction of the display region is satisfied in the reference coordinate system 87 of the robot.

In other words, the reference direction setting unit 22 calculates the normal direction of the reference plane 82 such that it passes through the reference point 83 as indicated by the arrow 82a. The reference direction setting unit 22 inclines the normal direction in the direction and at the angle of the arrow 91 expressed in the reference coordinate system 87. The direction indicated by the arrow 81 is the direction that is parallel to the reference direction. Also, the reference direction setting unit 22 sets, as the reference direction indicated by the arrow 80, the direction that is parallel to the direction indicated by the arrow 81.

By setting the reference direction in this manner, it is possible to stably set the reference direction even in a case where the position of each of the joint axes of the robot 1 changes due to driving of the robot 1. For example, it is possible to set a predetermined direction in the reference coordinate system of the robot, such as a gravity direction, as the reference direction as will be described later. In this case, there is a problem that the display phase direction cannot be defined in a case where the normal direction of the display region of the display part is parallel to the reference direction. However, such a problem does not occur, and it is possible to stably set the reference direction under the control of setting the reference direction from the normal direction of the reference plane.

Alternatively, there may be a case where the orientation relationship between the display part and the reference direction changes during a period when the control of setting, as the reference direction, the predetermined direction in the reference coordinate system of the robot is performed. In this case, there may be a case where the reference plane and the reference direction in the display region of the display part may perpendicularly intersect each other or are brought into an orientation relationship that is close to perpendicular intersection, and due to the orientation relationship, the change in the display phase direction becomes large, or a large change in display phase direction often occurs. As a result, there may be a case where the calculation of the display phase direction becomes unstable. At this time, the control may be switched to control of setting the reference direction from the normal direction of the reference plane.

Since an image is displayed in the display region of the display part in the orientation maintaining the predetermined orientation relationship in the reference coordinate system of the robot when the robot is driven, it is possible to allow the operator to easily view the image displayed on the display part. Alternatively, it is possible to display the input image that allows the operator to easily perform an input operation.

Figure 12:
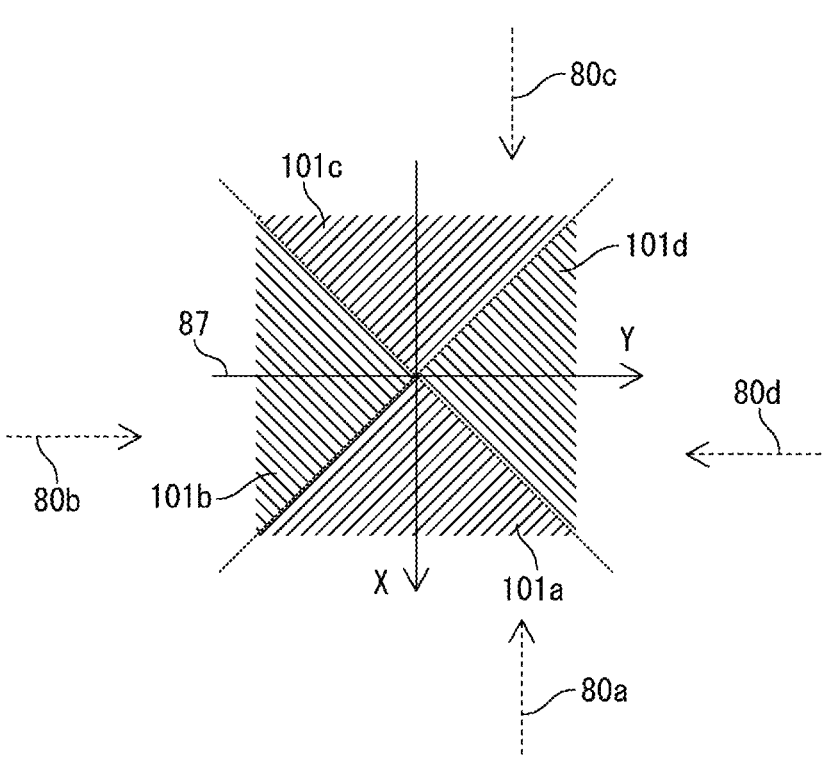
FIG. 12 is a schematic diagram for explaining second control for setting the reference direction.

FIG. 12 is a schematic plan view for explaining second control in which the reference direction setting unit sets the reference direction. The reference direction setting unit 22 may set the reference direction, in accordance with the range of the position where the display part is present and the range of orientation of the display part, in the coordinate system as a reference such as the reference coordinate system 87 of the robot. As the position where the display part is present, it is possible to employ the position where the origin of the display coordinate system or the reference point is present. As the orientation of the display part, it is possible to employ the orientation of the display coordinate system. In a case where the position of the display part changes with driving of the robot, for example, the reference direction may be changed in accordance with the position where the display part is present in the coordinate system as a reference.

The range when the reference direction is set in accordance with the position where the display part is present may be a range defined by the two coordinate axes of the reference coordinate system of the robot. Also, the range in which the position where the display part is present is determined may be a range defined by one coordinate axis or three coordinate axes of the reference coordinate system of the robot.

In the example illustrated in FIG. 12, four ranges 101a, 101b, 101c, and 101d are defined on the basis of the two coordinate axes (the X axis and the Y axis) of the reference coordinate system 87 of the robot. The reference direction setting unit 22 can set the reference direction indicated by the arrow 80a in a case where the display part is disposed inside the range 101a. The reference direction setting unit 22 can set the reference direction indicated by the arrow 80*b* in a case where the display part is disposed inside the range 101*b*. As in the control, the reference direction setting unit 22 can set the reference directions indicated by the arrows 80*c* and 80*d* in a case where the display part is disposed inside the corresponding ranges 101*c* and 101*d*. The reference direction in each of the ranges 101*a*, 101*b*, 101*c*, and 101*d* can be set in the reference coordinate system 87.

By setting the reference direction in this manner, it is possible to allow the operator to easily view the image displayed on the display part, in accordance with the range of the position where the display part is present or the range of the orientation, when the robot is driven. Also, it becomes easier for the operator to perform an input on the input image. For example, in a case where a plurality of operators work in the surroundings of the robot, it becomes easier for each operator to view the display by changing the reference direction in accordance with an operation range of the operator.

Figure 13:
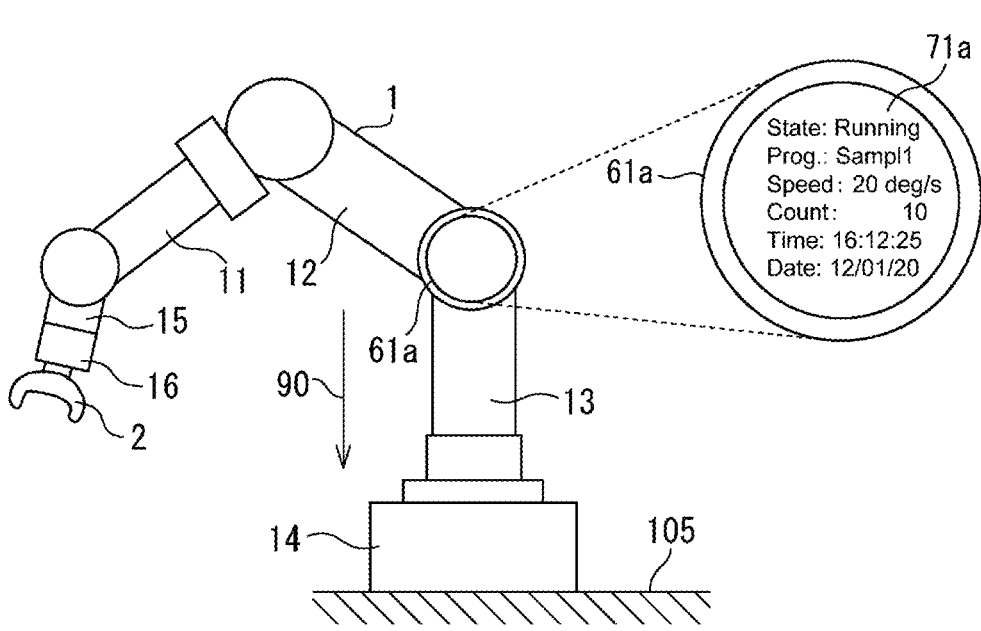
FIG. 13 is a first schematic diagram of the robot for explaining third control for setting the reference direction.
Figure 14:
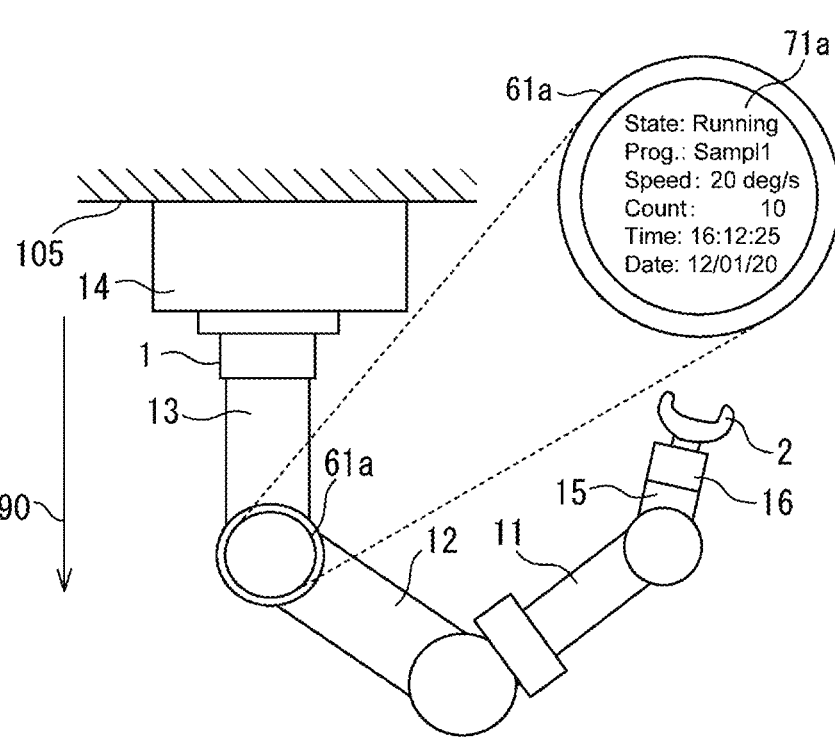
FIG. 14 is a second schematic diagram of the robot for explaining the third control for setting the reference direction.
Figure 15:
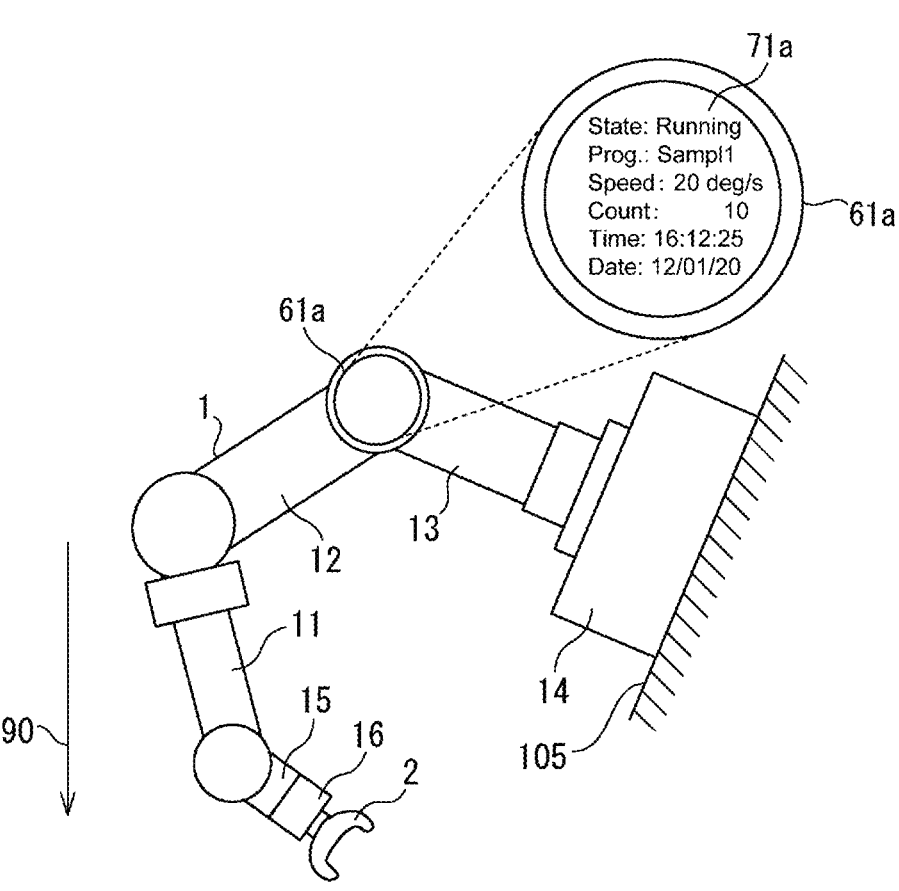
FIG. 15 is a third schematic diagram of the robot for explaining the third control for setting the reference direction.

FIG. 13 is a first schematic diagram of the robot for explaining third control in which the reference direction setting unit sets the reference direction. FIG. 14 is a second schematic diagram of the robot for explaining the third control in which the reference direction setting unit sets the reference direction. FIG. 15 is a third schematic diagram of the robot for explaining the third control in which the reference direction setting unit sets the reference direction. In FIGS. 13 to 15, enlarged views of the image 71*a* displayed on the display part 61*a* are illustrated in addition to the schematic diagrams of the robot.

In FIG. 13, the robot 1 is disposed above the installation surface 105. In FIG. 14, the robot 1 is disposed below the installation surface 105. In FIG. 14, the robot 1 is suspended. In FIG. 15, the installation surface 105 is inclined. In any of the robots 1, the base 14 is fixed to the installation surface 105. The arrow 90 indicates the gravity direction (the downward direction in the vertical direction).

The reference direction setting unit 22 may set the gravity direction as the reference direction, the direction opposite to the gravity direction, or the direction obtained by rotating the gravity direction in a predetermined orientation. In other words, the reference direction setting unit 22 may set, as the reference direction, a direction defined by the reference coordinate system 87. In the examples illustrated in FIGS. 13 to 15, the reference direction is set to the upward direction in the vertical direction (the direction opposite to the direction indicated by the arrow 90). Each display part 61*a* is disposed in a different direction. However, the display control unit 27 displays the image 71*a* such that the upward direction in the vertical direction corresponds to the upper side of the image regardless of the orientation of the display part 61*a*.

The third control is effective in a case where the normal direction of the display region (reference plane) of the display part has an angle equal to or greater than a certain angle, with the gravity direction. The reference direction defined through the control is a direction based on the gravity direction and is thus a direction that can be intuitively recognized by the operator. For example, the display device may be controlled such that an image is displayed while maintaining a predetermined angle that is equal to or greater than 0 degrees relative to the horizontal direction, regardless of the angle of the joint axis of the robot where the display part is provided. Also, the control may be performed such that an input image to be displayed such as a button is also displayed while maintaining a predetermined angle relative to the horizontal direction, in a case where the display part is formed of a touch screen for a teaching operation.

By setting the reference direction on the basis of the gravity direction in this manner, it becomes easier for the operator to view the image displayed on the display part regardless of the installation state of the robot and the orientation of the robot. Also, it becomes easier for the operator to perform an input on the input image.

Figure 16:
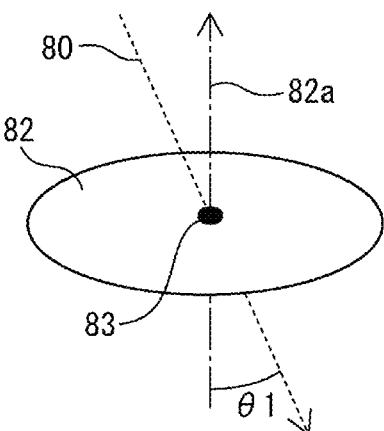
FIG. 16 is a schematic diagram for explaining fourth control for setting the reference direction.

FIG. 16 is a perspective view of the reference plane for explaining fourth control in which the reference direction setting unit sets the reference direction. There may be a case where the angle formed between the reference direction and the normal direction of the reference plane changes due to driving of the robot and the angle formed between the reference direction and the normal direction of the reference plane becomes smaller than a predetermined threshold value. For example, there may be a case where an angle $\theta 1$ formed between the reference direction indicated by the arrow 80 and the normal direction of the reference plane 82 indicated by the arrow 82*a* becomes smaller than the predetermined threshold value due to changes in position and orientation of the robot 1.

In this case, it is allowable that the reference direction setting unit 22 does not change the reference direction before the angle $\theta 1$ becomes smaller than the predetermined threshold value. In other words, when the position and the orientation of the robot change and the angle $\theta 1$ becomes smaller than the predetermined threshold value, the reference direction setting unit 22 may maintain the reference direction immediately before that.

In a case where the relationship between the orientations of the display region of the display part and the reference direction changes due to driving of the robot and the reference direction becomes closer to the normal direction of the reference plane 82, there may be a case where it is not possible to stably calculate the orientation of an image on the display part (display phase direction). In such a situation, the reference direction is not changed but maintained, whereby it is possible to display the image with the orientation of the image determined.

Figure 17:
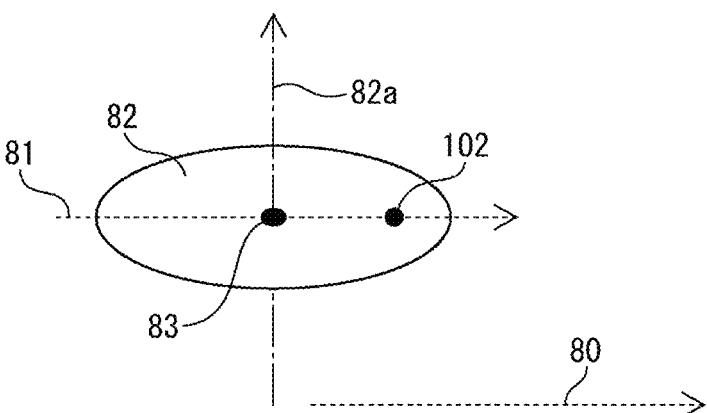
FIG. 17 is a schematic diagram for explaining fifth control for setting the reference direction.

FIG. 17 is a perspective view of the reference plane for explaining fifth control in which the reference direction setting unit sets the reference direction. The reference direction setting unit 22 may set the reference direction on the basis of the position designated by the operator in the display region of the display part. In the example described here, the reference plane 82 is set in the same plane as the display region of the display part.

The operator changes the position and the orientation of the robot 1 such that the reference plane 82 is in the predetermined orientation. The display control unit 27 displays the reference point 83 in the display region of the display part. In a case where the display part is formed of a touch screen display panel, a designation point 102 is designated by the operator pressing a desired point in the display region of the display part. The reference direction setting unit 22 calculates a direction indicated by the arrow 81 from the reference point 83 toward the designation point 102. The reference direction setting unit 22 sets, as the reference direction indicated by the arrow 80, a direction that is parallel to the arrow 81. The reference direction can be set in the reference coordinate system of the robot.

In the fifth control, the reference direction is set to a direction in the plane of the display region of the display part. In this regard, in a case where the desired reference direction is a direction that intersects the plane of the display region of the display part, the operator can change the position and the orientation of the robot and change the orientation of the display region of the display part.

In the fifth control, it is possible to easily set the reference direction such that the orientation of an image is adjusted to a direction that is convenient for the operator in accordance with the state of the robot. With such control, it is possible to easily set the reference direction that allows the operator to easily view the display on the display part. Also, the operator can easily perform an input on the input image.

It should be noted that there may be a case where the display region and the reference plane are not in the same plane, depending on the shape or the like of the display region. For example, there may be a case where the display region of the display part is formed having a curved shape. In this case, the reference direction setting unit can project the designation point designated by the operator onto the reference plane in a predetermined direction. Also, the reference direction may be set on the basis of the point projected onto the reference plane.

Although the direction from the reference point toward the designation point is set as the reference direction in the aforementioned embodiment, the embodiment is not limited to this. An arbitrary direction based on the designation point designated in the display region by the operator can be set as the reference direction. For example, the control of designating the designation point in the display region may be performed when the orientation of the reference direction relative to the normal direction of the reference plane is set in the first control of setting the reference direction.

Display Phase Calculating Unit

Figure 18:
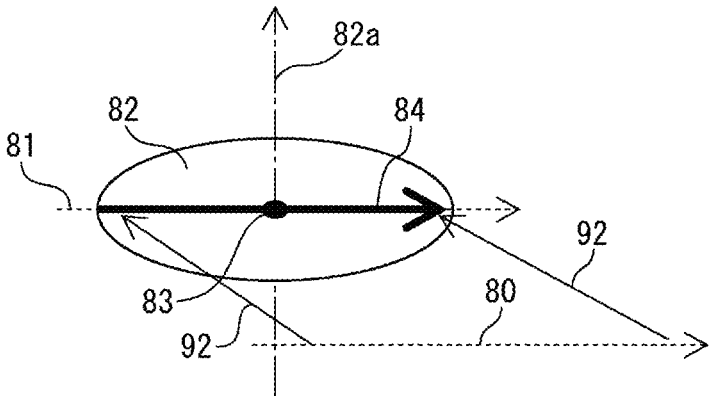
FIG. 18 is a schematic diagram for explaining first control for setting a display phase direction.

FIG. 18 is a perspective view of the reference plane for explaining first control of calculating the display phase direction. The display phase calculating unit 25 calculates the display phase direction (the direction indicated by the arrow 84), which is a direction as a reference for the orientation of display in the display region of the display part, by projecting the reference direction indicated by the arrow 80 onto the reference plane 82, which is a plane as a reference for the display region of the display part. FIG. 18 illustrates a case where the reference direction indicated by the arrow 80 and the normal direction of the reference plane 82 indicated by the arrow 82a perpendicularly intersect each other. In this case, the display phase calculating unit 25 can project the reference direction in an arbitrary direction as indicated by the arrow 92. The display phase calculating unit 25 projects the reference direction onto the reference plane 82. Then, the display phase direction indicated by the arrow 84 can be defined such that it passes through the reference point 83.

Figure 19:
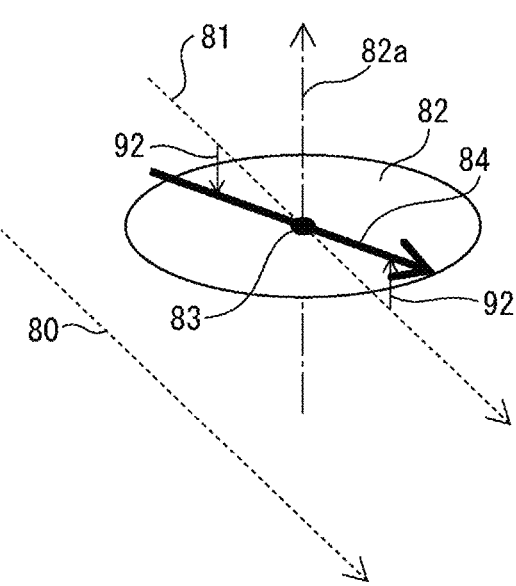
FIG. 19 is a schematic diagram for explaining second control for setting the display phase direction.

FIG. 19 is a perspective view of the reference plane for explaining second control of calculating the display phase direction. FIG. 19 illustrates a case where the reference direction indicated by the arrow 80 is inclined without perpendicularly intersecting the normal direction of the reference plane 82 indicated by the arrow 82a. The display phase calculating unit 25 calculates the direction that is parallel to the reference direction passing through the reference point 83 as indicated by the arrow 81, on the basis of the reference direction indicated by the arrow 80.

The display phase calculating unit 25 projects the direction that is parallel to the reference direction passing through the reference point 83 in the normal direction of the display region as indicated by the arrow 92. The display phase calculating unit 25 projects the direction that is parallel to the reference direction passing through the reference point 83 onto the reference plane 82. With such control, it is possible to define, as indicated by the arrow 84, the display phase direction as a reference of the phase of display in the display coordinate system.

Alternatively, the display phase calculating unit 25 calculates the direction in which the reference direction indicated by the arrow 80 is projected onto the reference plane 82 in the normal direction of the display region. Then, the display phase calculating unit 25 calculates the direction that passes through the reference point 83 such that the direction is parallel to the projecting direction. The display phase calculating unit 25 can define the direction as the display phase direction.

Figure 20:
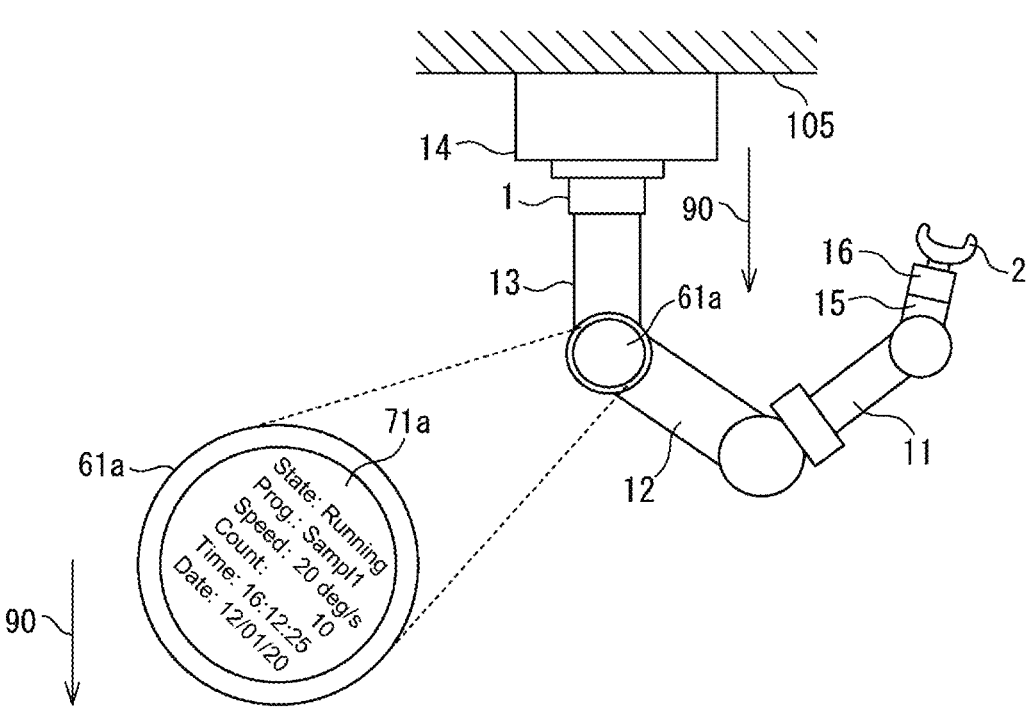
FIG. 20 is a schematic diagram of the robot for explaining third control for setting the display phase direction.
Figure 21:
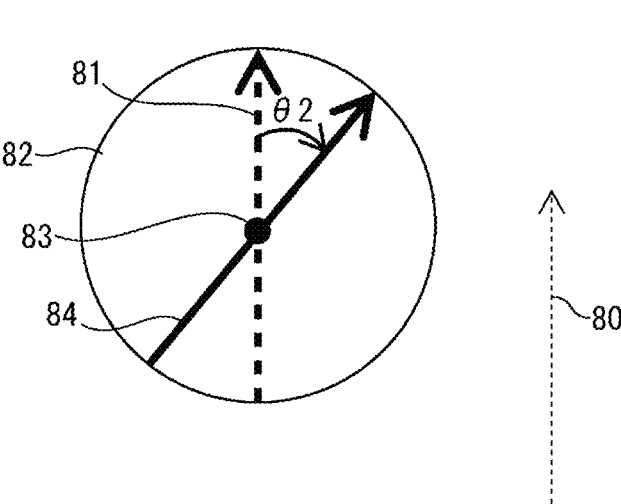
FIG. 21 is a schematic diagram for explaining the third control for setting the display phase direction.

FIG. 20 is a schematic diagram of the robot for explaining third control of calculating the display phase direction. FIG. 21 is a plan view of the reference plane for explaining the third control of calculating the display phase direction. Referring to FIGS. 3, 20, and 21, the display phase calculating unit 25 projects the reference direction onto the reference plane 82, which is a plane as a reference for the display region of the display part 61a. Moreover, the display phase calculating unit 25 may calculate the display phase direction such that it is rotated, by an offset angle that is a predetermined angle, about the reference point 83 as the center, which is a point as a reference for display in the display region of the display part.

In this case, the reference direction is defined as an upward direction in the vertical direction as indicated by the arrow 80. The display phase calculating unit 25 calculates the direction that is parallel to the reference direction in the reference plane 82 by projecting the reference direction onto the reference plane 82. The display phase calculating unit 25 calculates the direction that is parallel to the reference direction passing through the reference point 83 as indicated by the arrow 81.

The processing unit 21 according to the present embodiment includes an offset angle setting unit 26 that sets an offset angle, which is a predetermined angle around the reference point as the center in the display region. The offset angle setting unit 26 sets the offset angle in response to an operator's operation. For example, the operator inputs an offset angle $\theta 2$ by using a teaching pendant. Then, the offset angle setting unit 26 can set the offset angle $\theta 2$ relative to the direction indicated by the arrow 81 of the reference direction projected onto the reference plane.

Next, the display phase calculating unit 25 rotates the direction indicated by the arrow 81 by the offset angle $\theta 2$, which is a predetermined rotation angle around the reference point 83 as the center. The display phase calculating unit 25 rotates the direction in which the reference direction is projected in the reference plane 82. Then, the display phase calculating unit 25 calculates the display phase direction indicated by the arrow 84. The display control unit 27 controls the orientation of an image in the display region of the display part 61a and displays the image on the basis of the display phase direction calculated by the display phase calculating unit and the reference point 83.

As illustrated in FIG. 20, the image 71a displayed on the display part 61a is inclined at the offset angle $\theta 2$ relative to the direction of the reference direction projected onto the reference plane. With such control, it is possible to easily offset the orientation of the image displayed in the display region of the display part and to display the image for the operator. It is possible to display the image such that it has a predetermined phase relationship relative to a predetermined direction based on the reference direction. In a case where the operator views the display part from a specific direction, information is displayed in accordance with the specific direction and thus is easily viewed. Also, the operator can easily perform an input operation on an input image in a case where the display device has an input function.

Figure 22:
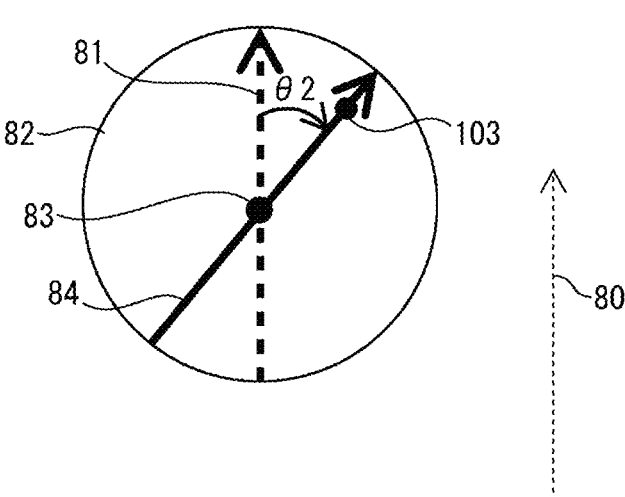
FIG. 22 is a schematic diagram for explaining fourth control for setting the display phase direction.

FIG. 22 is a plan view of the reference plane for explaining fourth control of setting the display phase direction. In the example described here, the reference plane 82 and the display region of the display part are disposed in the same plane. The offset angle setting unit 26 is formed such that it can set the offset angle θ2 in response to an operator's operation on the display region of the display part.

The display control unit 27 displays the direction of the current reference direction projected onto the reference plane 82 as indicated by the arrow 81. The operator designates a designation point 103 by pressing the display region of the display part. The offset angle setting unit 26 calculates the offset angle θ2 relative to the direction indicated by the arrow 81. The display phase calculating unit 25 sets the display phase direction on the basis of the offset angle θ2. The display control unit 27 controls the orientation of an image in the display region of the display part 61a and displays the image on the basis of the display phase direction calculated by the display phase calculating unit 25 and the reference point 83.

It should be noted that in a case where the display region of the display part has a curved shape, the offset angle may be set on the basis of the point obtained by projecting, onto the reference plane, the point where the operator comes into contact with the display region. For example, the offset angle may be calculated on the basis of a point obtained by projecting the designation point designated by the operator in the normal direction of the reference plane. Alternatively, control of rotating the image on the basis of such an offset angle need not be performed.

Display Control Unit

The display control unit 27 controls an image displayed in the display region of the display part. Also, the display control unit 27 controls the orientation of an input image and displays it in a case where the display part displays the input image. The display control unit 27 controls the orientation of the image in the display region of the display part and displays the image such that the image having a predetermined relationship of orientation relative to the reference direction is displayed, on the basis of the axis position of each of the joint axes of the robot and the reference direction.

Also, the display control unit 27 controls the position and the orientation of the image in the display region of the display part and displays the image on the basis of the axis position of each of the joint axes of the robot, the reference direction, the reference point in the display coordinate system, and the display phase direction in the display coordinate system calculated by the display phase calculating unit 25.

It should be noted that there may be a case where the robot is mounted on a device that changes the position and the orientation of the robot, such as a device having a traveling axis or another drive device. In this case, the processing unit 21 preferably displays an image on the basis of the axis position of each of the joint axes of the robot and the movement amount of such a drive part.

The display control unit 27 controls the orientation of the image in the display region of the display part and thus can display the image in a desired orientation in the display region of the display part in a case where the orientation of the display part changes due to driving of the robot. Alternatively, it is possible to display the input image in a desired orientation and to allow an input operation.

Figure 23:
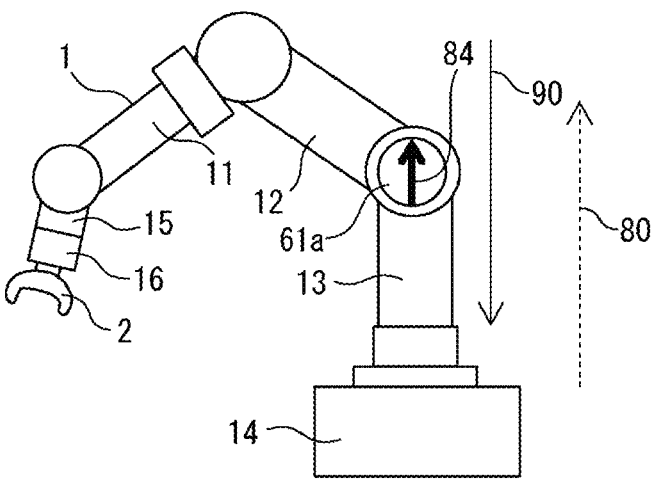
FIG. 23 is a schematic diagram showing a display phase direction of the display part when the robot is in first position and orientation.

Next, a specific example of the image displayed by the display control unit 27 will be described. FIG. 23 is a schematic side view of the robot when the robot is in the first position and orientation. In this case, a case where the reference direction indicated by the arrow 80 is the upward direction in the vertical direction will be described in regard to the image on the display part 61a. Such a reference direction can be set in first control or third control of setting the reference direction according to the present embodiment, for example. In the display part 61a, the display phase direction indicated by the arrow 84 is directed in the same direction as the reference direction indicated by the arrow 80. In other words, the display phase direction indicated by the arrow 84 is directed to the upper side in the vertical direction.

Figure 24:
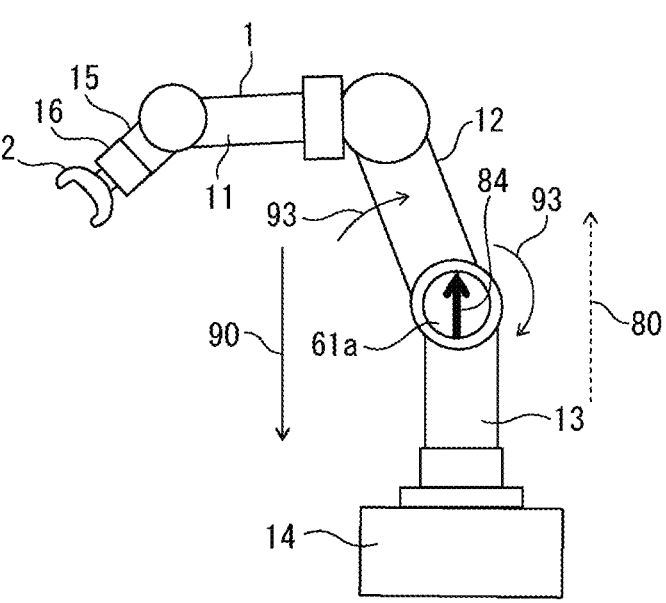
FIG. 24 is a schematic diagram showing a display phase direction when the robot is driven from the first position and orientation and the display control is performed.
Figure 25:
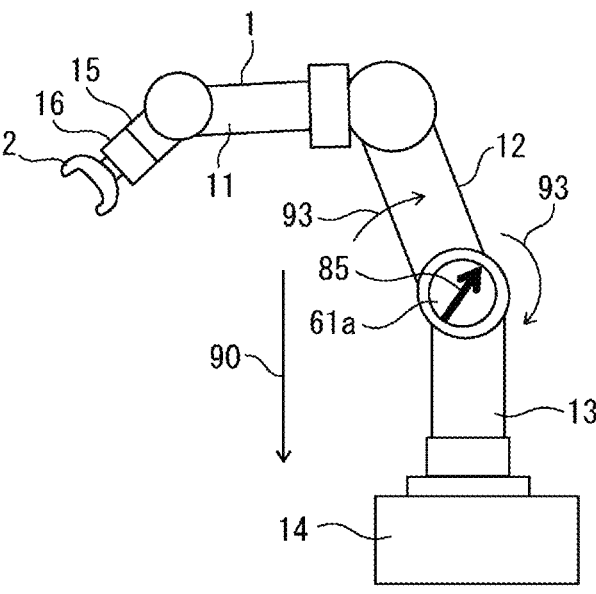
FIG. 25 is a schematic diagram showing a display phase direction when the robot is driven from the first position and orientation and the display control is not performed.

FIG. 24 is a schematic diagram of the robot when the robot is driven from the first position and orientation. FIG. 25 illustrates a schematic diagram of a robot in a comparative example when the robot is driven from the first position and orientation. In this case, the axis position of the J2 axis 52 between the turning base 13 and the lower arm 12 has changed. As indicated by the arrow 93, the lower arm 12 has been turned, and the orientation has changed.

FIG. 24 illustrates a state of an image on the display part 61a when the control of display by the processing unit 21 according to the present embodiment is performed. The display control unit 27 controls the orientation of the image in the display region of the display part 61a such that the image having a predetermined relationship of orientation relative to the reference direction is displayed, on the basis of the axis position of each of the joint axes of the robot 1 and the reference direction. The display phase direction indicated by the arrow 84 is maintained parallel to the reference direction. In other words, the display phase direction is maintained in the upward direction in the vertical direction.

In the comparative example illustrated in FIG. 25, the control of display according to the present embodiment is not performed. In the display part 61a, the display phase direction indicated by the arrow 85 is turned with turning of the lower arm 12. As a result, an image displayed on the display part 61a is inclined. It becomes difficult for the operator to view the image displayed on the display part 61a.

On the other hand, referring FIG. 24, the processing unit 21 according to the present embodiment performs the control of display, whereby the display phase direction indicated by the arrow 84 is directed to the upper side in the vertical direction even when the axis position of the joint axis changes. Therefore, a state where the image displayed on the display part 61a can be easily viewed is maintained.

Figure 26:
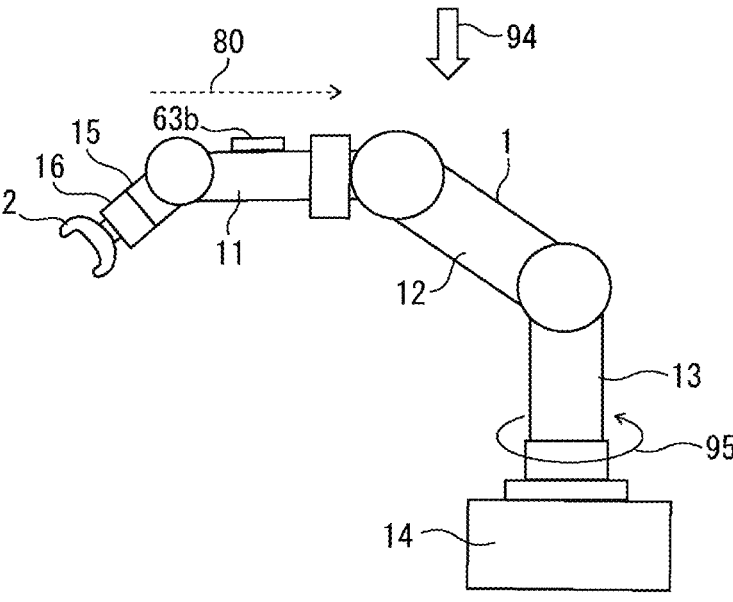
FIG. 26 is a schematic diagram of the robot in second position and orientation.
Figure 27:
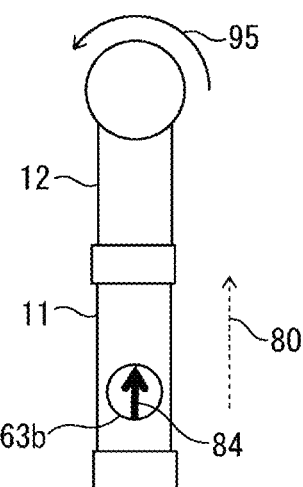
FIG. 27 is a schematic plan view showing a display phase direction of the display part when the robot is in the second position and orientation.

FIG. 26 is a schematic side view of the robot when the robot is in the second position and orientation. FIG. 27 is a schematic plan view of the robot when the robot is in the second position and orientation. In this example, the display region (reference plane) of the display part 63b is parallel to the horizontal direction. In regard to the display part 63b, the reference direction indicated by the arrow 80 is set to the horizontal direction. Such a reference direction can be set in first control, second control, or third control of setting the reference direction according to the present embodiment.

In the display part 63b, the display phase direction indicated by the arrow 84 is directed to the horizontal direction. Also, the operator views the display part 63b from the upper side of the robot 1 as indicated by the arrow 94. The display phase direction indicated by the arrow 84 is a direction in which the operator can easily view the image.

US 12,569,980 B2

23

Figure 28:
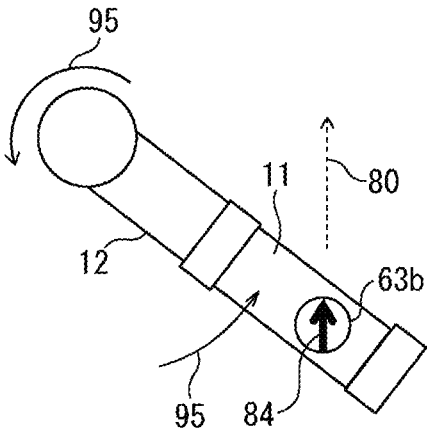
FIG. 28 is a schematic plan view showing a display phase direction when the robot is driven from the second position and orientation and display control is performed.
Figure 29:
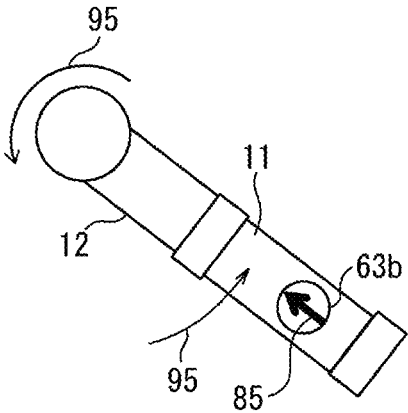
FIG. 29 is a schematic plan view showing a display phase direction when the robot is driven from the second position and orientation and the display control is not performed.

FIG. 28 is a schematic diagram of the robot when the robot is driven from the second position and orientation. FIG. 29 is a schematic diagram of a robot in a comparative example when the robot is driven from the second position and orientation. In the example described here, the turning base 13 is turned around the J1 axis 51 as indicated by the arrow 95.

In the example illustrated in FIG. 28, control of display by the processing unit 21 is performed. The display control unit 27 controls the orientation of an image in the display region of the display part and displays the image such that display having a predetermined relationship of orientation relative to the reference direction is provided, on the basis of the axis position of each of the joint axes of the robot and the reference direction. The display phase direction indicated by the arrow 84 is parallel to the reference direction indicated by the arrow 80.

In the comparative example illustrated in FIG. 29, the control of display according to the present embodiment is not performed. The display phase direction indicated by the arrow 85 on the display part 63*b* changes along with turning of the upper arm 11. As a result, the image displayed on the display part 63*b* is inclined in a case where the operator views the display part 63*b*. It becomes difficult for the operator to view the image displayed on the display part 63*b*.

Referring to FIG. 28, the processing unit 21 according to the present embodiment performs the control of display, whereby the display phase direction indicated by the arrow 84 is maintained parallel to the reference direction even when the axis position of the joint axis changes. The image displayed on the display part 63*b* is displayed in the same orientation even when the robot is driven. Therefore, it is possible to maintain a state where the operator can easily view the image displayed on the display part 63*b*.

Figure 30:
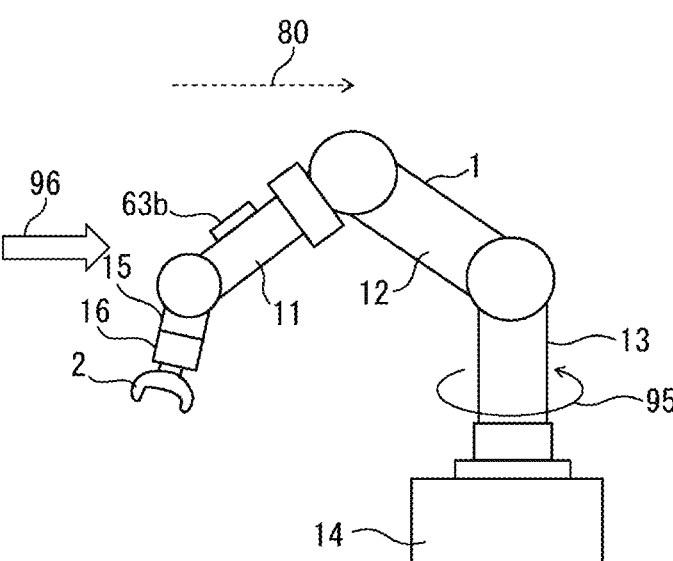
FIG. 30 is a schematic diagram of the robot in third position and orientation.

FIG. 30 is a schematic side view of the robot when the robot is in the third position and orientation. The upper arm 11 to which the display part 63*b* is fixed is inclined relative to the horizontal direction. In regard to the display part 63*b*, the reference direction indicated by the arrow 80 is set so as to be directed in the horizontal direction. Such a reference direction can be set in second control or third control of setting the reference direction according to the present embodiment. In the example described here, the normal direction of the display region (reference plane) of the display part 63*b* and the reference direction do not perpendicularly intersect each other. The operator views the display part 63*b* in the direction indicated by the arrow 96.

Figure 31:
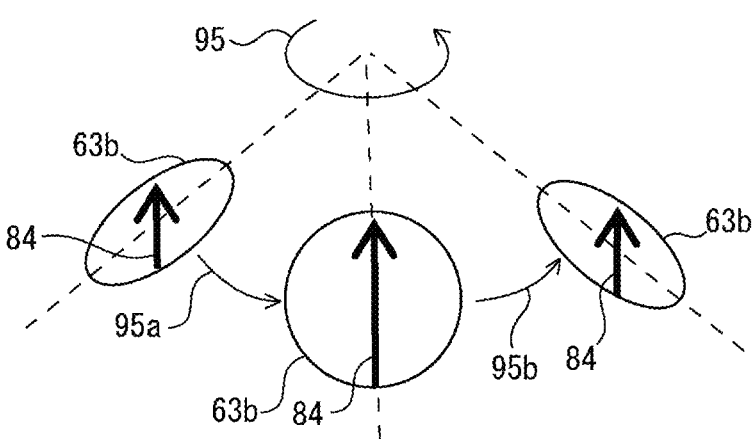
FIG. 31 is a schematic front view showing a display phase direction of the display part when the robot is driven from the third position and orientation and display control is performed.

FIG. 31 is an explanatory diagram of the display phase direction when the robot is driven from the third position and orientation. Referring to FIGS. 30 and 31, the turning base 13 is turned around the J1 axis 51 as indicated by the arrow 95 in the example described here. In the example illustrated in FIG. 31, control of display by the processing unit 21 is performed. The display control unit 27 controls the orientation of the image in the display region of the display part and displays the image such that the image having a predetermined relationship of orientation relative to the reference direction is displayed, on the basis of the axis position of each of the joint axes of the robot and the reference direction.

The display phase direction indicated by the arrow 84 is maintained in the direction in which the reference direction is projected onto the display region (reference plane) of the display part 63*b* even when the upper arm 11 is turned as indicated by the arrows 95*a* and 95*b*. The display phase direction indicated by the arrow 84 is a direction in which the operator can easily view the image. The image is displayed in the same orientation when the operator views the display part 63*b* in the direction indicated by the arrow 96.

Figure 32:
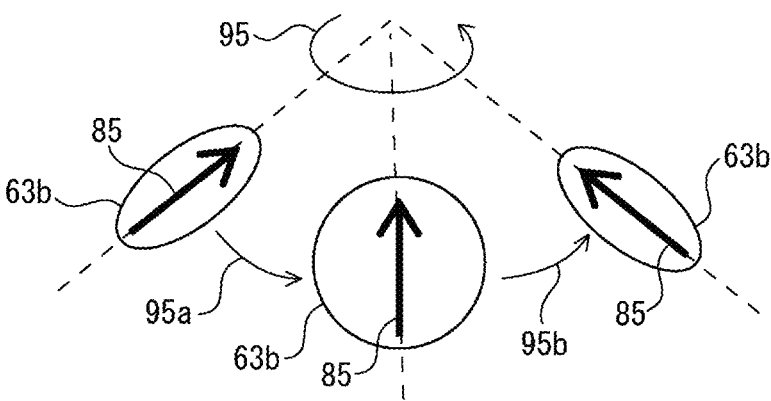
FIG. 32 is a schematic front view showing a display phase direction of the display part when the robot is driven from the third position and orientation and display control is not performed.

FIG. 32 is an explanatory diagram of a display phase direction in a comparative example when the robot is driven from the third position and orientation. In the comparative example, the control of display according to the present embodiment is not performed. The display phase direction indicated by the arrow 85 on the display part 63*b* is changing with turning of the upper arm 11 indicated by the arrows 95*a* and 95*b*. As a result, the image displayed on the display part 63*b* is inclined in a case where the operator views the display part 63*b*. It becomes difficult for the operator to view the image displayed on the display part 63*b*.

Referring to FIG. 31, the processing unit 21 performs the control of display according to the present embodiment, whereby the display phase direction is maintained in the direction in which the operator can easily view the image even when the axis position of the joint axis is changed. Therefore, it is possible to maintain a state where the operator can easily view the image displayed on the display part 63*b*.

Although the display coordinate system, the reference plane, and the reference point are set in the display region of the display part and the display phase direction is then calculated in the aforementioned embodiment, the embodiment is not limited to this. The processing unit need not set the display coordinate system, the reference plane, and the reference point. The processing unit can calculate the display phase direction through arbitrary control on the basis of the reference direction. The processing unit may set the reference direction as the display phase direction in a case where the reference direction and the display region of the display part are parallel to each other, for example.

Moreover, the display control unit may perform image processing on an image generated in the reference plane. For example, it is possible to perform an arbitrary image transformation operation, such as enlargement of the image, size reduction of the image, or predetermined image transformation. Then, the display control unit can display the transformed image on the display part. For example, it is possible to generate an image to be displayed in the display region by projecting the image on the reference plane onto the display region of the display part in a case where the display region of the display part has a curved shape, as described above.

Examples of Images Displayed on Display Part

Next, examples of images displayed in the display region of the display part by the display control unit will be described. In this case, examples of the images displayed on the display part 61*a* will be described.

Figure 33:
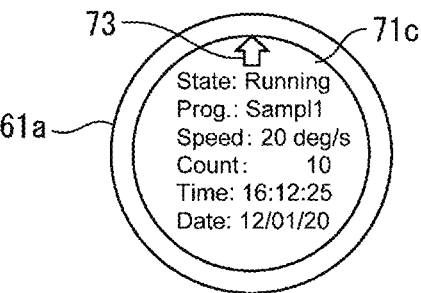
FIG. 33 is a fourth image displayed on the display part.
Figure 34:
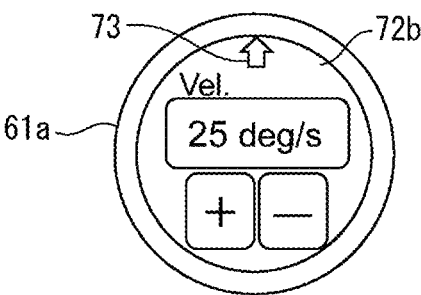
FIG. 34 is a fifth image displayed on the display part.

FIG. 33 illustrates a fourth image displayed on the display part. FIG. 34 illustrates a fifth image displayed on the display part. A fourth image 71*c* is an image illustrating a driving state of the robot. A fifth image 72*b* is an input image to which a drive speed of rotation of the joint axis where the display part is disposed or a desired joint axis is input. It should be noted that a joint axis other than one joint axis may also be driven along with the one joint axis. In this case, when the drive speed of rotation of the one joint axis is changed, the drive speeds of all the joint axes may be adjusted such that the position and the orientation of the tip part of the robot do not change. Additionally, the movement speed of the tip part of the robot in the operation program that is executed may be changed in the input image displayed on the display part. The display control unit 27 can display information or an input image by using at least one of a letter, a figure, a symbol, a color, and a pattern in the display region of the display part.

Moreover, the display control unit 27 may display the image such that the orientation thereof is indicated by using at least one of a letter, a figure, a symbol, a color, and a pattern. In the fourth image 71c and the fifth image 72b, an image 73 of an arrow indicating the upper side of the image is displayed.

In this manner, the display control unit generates an image in the display region such that the orientation of the image can be known, whereby the operator can easily recognize the orientation of the image in the display region of the display part. Also, in a case where the display part displays the input image, it is possible to improve operability of the operator.

Figure 35:
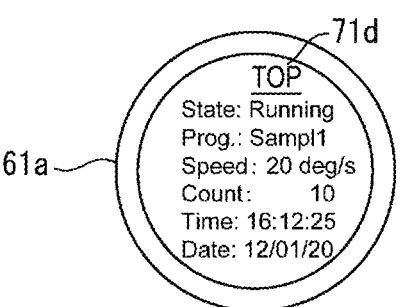
FIG. 35 is a sixth image displayed on the display part.
Figure 36:
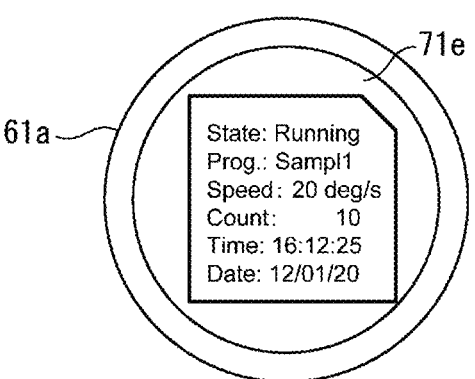
FIG. 36 is a seventh image displayed on the display part.

FIG. 35 illustrates a sixth image displayed on the display part. FIG. 36 illustrates a seventh image displayed on the display part. In the sixth image 71d, the letters "TOP" indicating the upper side of the image are displayed. In the seventh image 71e, a recessed part of the frame surrounding information indicating a driving state indicates the upper side of the image.

Figure 37:
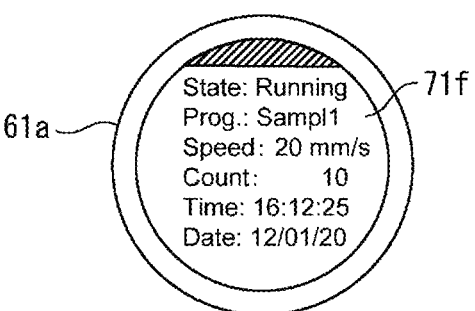
FIG. 37 is an eighth image displayed on the display part.
Figure 38:
FIG. 38 is a ninth image displayed on the display part.

FIG. 37 illustrates an eighth image displayed on the display part. FIG. 38 illustrates a ninth image displayed on the display part. In the eighth image 71f and the ninth image 71g, patterns indicating the upper side are displayed at the respective upper parts. Moreover, the pattern indicating the upper side is displayed with a color that is different from the background color of the display region in the ninth image 71g. In this manner, the display control unit 27 can generate an image such that the orientation of the image is indicated in various modes.

Although the image indicating the upper side has been described in the above embodiment, the embodiment is not limited to this. It is only necessary for the display control unit to perform display such that the orientation of the image can be recognized. For example, the display control unit may display letters or the like indicating the lower side of an image.

Figure 39:
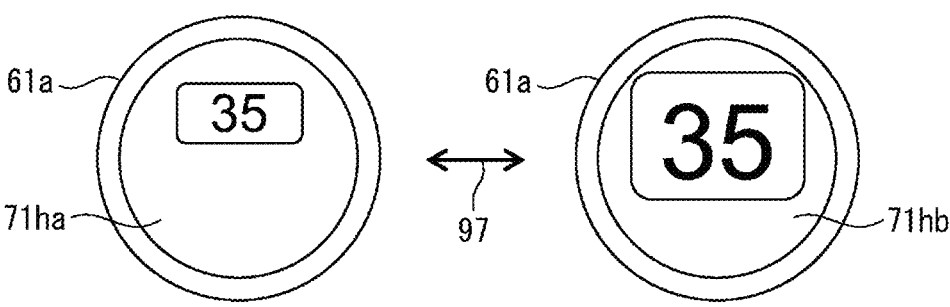
FIG. 39 is a tenth image displayed on the display part.
Figure 40:
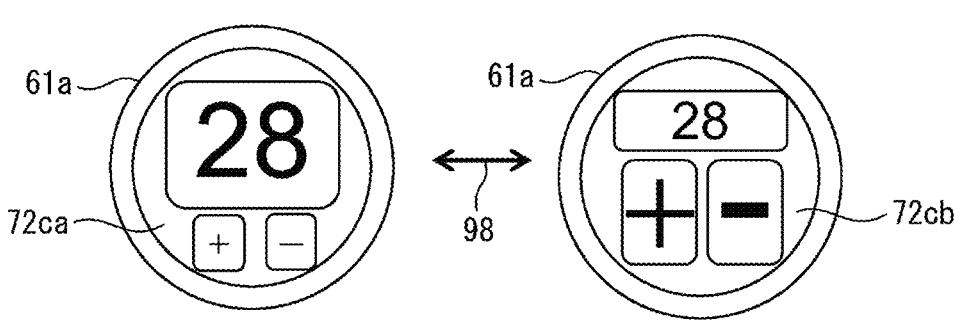
FIG. 40 is an eleventh image displayed on the display part.

FIG. 39 illustrates a tenth image displayed on the display part. FIG. 40 illustrates an eleventh image displayed on the display part. The display control unit 27 may perform control for changing the size of the image at a predetermined part in the display region of the display part 61a in accordance with a speed of movement of the display part 61a of the display device with driving of the robot. For example, the display control unit 27 may display a predetermined image with a small size in a case where the movement speed of the display part 61a is low and display the predetermined image with a large size in a case where the movement speed of the display part 61a is high.

In the tenth images 71ha and 71hb in FIG. 39, the number of times that an operation has been performed is displayed on the display part 61a. The display control unit 27 can change the size of the image of the number of times that the operation has been performed as indicated by the arrow 97 in accordance with the movement speed of the display part 61a. For example, the display control unit 27 can calculate the movement speed of the display coordinate system as the movement speed of the display part 61a. The display control unit 27 acquires the position of the origin of the display coordinate system and the clock time at predetermined time intervals. The display control unit 27 can calculate the movement speed of the origin of the display coordinate system on the basis of the position of the origin of the display coordinate system and the clock time.

The display control unit 27 can display the image of the number of times that the operation has been performed with a small size as illustrated in the image 71ha in a case where the movement speed of the display part 61a is lower than a predetermined threshold value. The display control unit 27 can display the image of the number of times that the operation has been performed with a large size as illustrated in the image 71hb in a case where the movement speed of the display part 61a is equal to or higher than the predetermined threshold value. By performing the control, the image of the desired part is displayed with a large size in a case where the drive speed of the robot is high, and the operator can thus easily view the displayed image.

Eleventh images 72ca and 72cb in FIG. 40 are input images allowing the operator to perform an input operation. In the eleventh images 72ca and 72cb, it is possible to change the predetermined setting value by pressing a "+" button or a "−" button. The display control unit 27 can change the size of the image in which the setting value is indicated as indicated by the arrow 98 in accordance with the movement speed of the display part 61a. Additionally, the display control unit 27 can change the size of the buttons.

The display control unit 27 can display the image of the setting value with a large size and display the images of the buttons with a small size as illustrated in the image 72ca in a case where the movement speed of the display part 61a is lower than a predetermined threshold value. The display control unit 27 can display the image of the setting value with a small size and display the images of the buttons with a large size as illustrated in the image 72ca in a case where the movement speed of the display part 61a is equal to or higher than the predetermined threshold value. With the control, since the image of the button becomes larger, the operator can stably press the button even when the drive speed of the robot becomes higher.

For the robot system according to the present embodiment, in a case where the display device has an input function, the operator can perform an input operation during a period when the robot is driven. The control of changing the size of an image in accordance with the movement speed of the display part is performed, whereby the operator can easily view the image and easily perform the input operation. For example, the images of the buttons are displayed with a large size when the movement speed of the display part becomes high, whereby the operator can easily perform the input operation. It should be noted that it is preferable to provide a limit for the movement speed of the robot or the drive speed of the joint axes, for which the input operation can be performed, for safety in a case where the input operation from the display device is allowed during the period when the robot is driven. For example, it is preferable to allow the input operation in a case where the movement speed of the robot or the drive speed of the joint axes is equal to or lower than a predetermined speed. Also, the setting value for which the input operation can be performed may be changed in accordance with the movement speed of the robot or the drive speed of the joint axis.

In each type of the aforementioned control, the order of steps can be appropriately changed within a range in which the functions and the effects are not changed. The aforementioned embodiments can be appropriately combined. In each of the aforementioned drawings, the same or similar parts are denoted by the same reference numerals. It should be noted that the aforementioned embodiments are examples and do not limit the invention. The embodiments include modifications of the embodiments described in the claims.

REFERENCE SIGNS LIST 1 robot
2 hand 4 controller
6 robot system
11 upper arm
12 lower arm
13 turning base
14 base
wrist
16 flange
21 processing unit
22 reference direction setting unit
23 coordinate system setting unit
24 coordinate system calculating unit
display phase calculating unit
26 offset angle setting unit
27 display control unit
42 storage
43 operation command unit
51 J1 axis
52 J2 axis
53 J3 axis
54 J4 axis
55 J5 axis
56 J6 axis
59 pedestal
R1, R2 rotation axis
60, 61a, 61b, 61c, 62, 63a, 63b, 64, 65, 66, 67 display part
71a, 71b, 71c, 71d, 71e, 71f, 71g, 71ha, 71hb image
72a, 72b, 72ca, 72cb image
82 reference plane
83 reference point
87 reference coordinate system
88 display coordinate system
101a to 101d range
102, 103 designation point
θ1 angle
θ2 offset angle

The invention claimed is:

1. A robot system, comprising:
a robot including a plurality of joint axes;
a display part disposed on a main body part of the robot;
a display control unit configured to control an image to be displayed in a display region of the display part; and
a reference direction setting unit configured to set a reference direction being a direction used as a reference when an orientation of the image to be displayed on the display part is determined,
wherein
the display control unit is configured to control the orientation of the image in the display region of the display part and display the image such that display with a predetermined relationship of an orientation relative to the reference direction is provided, based on an axis position of each of the plurality of joint axes of the robot and the reference direction,
the robot system further comprises:
a coordinate system setting unit configured to set a display coordinate system being a coordinate system set in the display region of the display part, a reference plane being a plane as a reference for the display region of the display part and set in the display coordinate system, and a reference point being a point as a reference for display in the display region of the display part and set in the display coordinate system;
a coordinate system calculating unit configured to calculate a position and an orientation of the display coordinate system based on the axis position of each of the joint axes of the robot; and a display phase calculating unit configured to calculate a display phase direction being a direction as a reference of an orientation of display in the display region of the display part by projecting the reference direction onto the reference plane in the display coordinate system, and
the display control unit is configured to control the orientation of the image in the display region of the display part and display the image, based on the display phase direction calculated by the display phase calculating unit and the reference point.

2. The robot system according to claim 1, wherein
the display part is configured to display an input image for inputting information and has an input function that allows information to be input in response to an operation according to the input image, and
the display control unit is configured to control an orientation of the input image and displays the input image.

3. The robot system according to claim 2, wherein in a case where information is input in the display part, the display part is configured to display an image in which an input of specific information for enabling an input operation of an operator is received, and perform switching into an image that allows the operator to perform the input operation when the operator inputs the specific information.

4. The robot system according to claim 2, wherein the display part is formed such that at least one of a privilege with which an input operation can be performed or a privilege regarding information to be displayed can be changed in response to a predetermined input operation performed by an operator.

5. The robot system according to claim 1, wherein the reference direction setting unit is configured to set the reference direction such that the reference direction has a predetermined relationship of orientation with a normal direction of the reference plane in a reference coordinate system of the robot.

6. The robot system according to claim 1, wherein the reference direction setting unit is configured to set the reference direction in accordance with a range in which the display part is present, in a reference coordinate system of the robot.

7. The robot system according to claim 1, wherein the reference direction setting unit is configured to set, as the reference direction, a gravity direction, a direction opposite to the gravity direction, or a direction obtained by rotating the gravity direction in a predetermined orientation.

8. The robot system according to claim 1, wherein the reference direction setting unit is configured to set the reference direction based on a position designated in the display region of the display part by an operator.

9. The robot system according to claim 1, wherein
the robot is configured to be driven to cause an angle formed between the reference direction and a normal direction of the reference plane to be changed,
in response to the angle formed between the reference direction and the normal direction being equal to or larger than a predetermined threshold value, the reference direction setting unit is configured to change the reference direction based on the position and orientation of the robot, and
in response to the angle formed between the reference direction and the normal direction being smaller than the predetermined threshold value, the reference direction setting unit is configured to not change but maintain the reference direction.

10. The robot system according to claim 1, wherein the display control unit is configured to control the display part such that an orientation of the image is indicated in the display region of the display part by using at least one of a letter, a figure, a symbol, a color, and a pattern.

11. The robot system according to claim 1, wherein the display control unit is configured to control the display part such that a size of an image at a predetermined part in the display region of the display part is changed in accordance with a speed of movement of the display part with driving of the robot.

12. The robot system according to claim 1, wherein the display part is attachable to and detachable from the main body part of the robot.

13. A robot system, comprising:

a robot including a plurality of joint axes;

a display part disposed on a main body part of the robot;

a display control unit configured to control an image to be displayed in a display region of the display part; and a reference direction setting unit configured to set a reference direction being a direction used as a reference when an orientation of the image to be displayed on the display part is determined, wherein the display control unit is configured to control the orientation of the image in the display region of the display part and display the image such that display with a predetermined relationship of an orientation relative to the reference direction is provided, based on an axis position of each of the plurality of joint axes of the robot and the reference direction, the robot system further comprises:

a coordinate system setting unit configured to set a display coordinate system being a coordinate system set in the display region of the display part, a reference plane being a plane as a reference for the display region of the display part and set in the display coordinate system, and a reference point being a point as a reference for display in the display region of the display part and set in the display coordinate system;

a coordinate system calculating unit configured to calculate a position and an orientation of the display coordinate system based on the axis position of each of the joint axes of the robot; and a display phase calculating unit configured to calculate a display phase direction being a direction as a reference of an orientation of display in the display region of the display part by projecting the reference direction onto the reference plane in the display coordinate system and further performing rotation about the reference point as the center by an offset angle being a predetermined angle, and the display control unit is configured to control the orientation of the image in the display region of the display part and display the image, based on the display phase direction calculated by the display phase calculating unit and the reference point.

14. The robot system according to claim 13, further comprising an offset angle setting unit configured to set an offset angle being a predetermined angle around the reference point as the center, based on a position designated in the display region of the display part by an operator.

* * * * *